US012270316B2

(12) United States Patent
Sato

(10) Patent No.: US 12,270,316 B2
(45) Date of Patent: Apr. 8, 2025

(54) BLADE, PROCESSING SYSTEM AND PROCESSING METHOD

(71) Applicant: NIKON CORPORATION, Tokyo (JP)

(72) Inventor: Shinji Sato, Fukaya (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 17/918,440

(22) PCT Filed: Apr. 22, 2020

(86) PCT No.: PCT/JP2020/017293
§ 371 (c)(1),
(2) Date: Dec. 5, 2022

(87) PCT Pub. No.: WO2021/214900
PCT Pub. Date: Oct. 28, 2021

(65) Prior Publication Data
US 2023/0134254 A1 May 4, 2023

(51) Int. Cl.
*F01D 5/14* (2006.01)
*B23K 26/38* (2014.01)

(52) U.S. Cl.
CPC .............. *F01D 5/147* (2013.01); *B23K 26/38* (2013.01); *F05D 2230/13* (2013.01)

(58) Field of Classification Search
CPC . F01D 5/14; F01D 5/147; F01D 5/288; F05D 2230/90; F05D 2240/126; F05D 2250/18; F05D 2250/181; F05D 2250/182; F05D 2250/184; F05D 2250/70
See application file for complete search history.

(56) References Cited

U.S. PATENT DOCUMENTS

| | | | | |
|---|---|---|---|---|
| 5,114,099 A | * | 5/1992 | Gao | ..................... B64C 21/10 244/130 |
| 8,323,775 B2 | * | 12/2012 | van Merkstoijn | ........ F15D 1/12 428/167 |
| 8,357,454 B2 | * | 1/2013 | Kulkarni | ............. C23C 28/3455 416/214 R |
| 10,450,867 B2 | | 10/2019 | Bunker | |
| 2009/0017260 A1 | | 1/2009 | Kulkarni et al. | |
| 2010/0159204 A1 | | 6/2010 | Van Merksteijn | |
| 2011/0014060 A1 | | 1/2011 | Bolcavage et al. | |

(Continued)

FOREIGN PATENT DOCUMENTS

| EP | 2 283 169 B1 | 5/2014 |
|---|---|---|
| JP | 2006-183598 A | 7/2006 |

(Continued)

OTHER PUBLICATIONS

Jul. 21, 2020 International Search Report issued in International Patent Application No. PCT/JP2020/017293.

(Continued)

*Primary Examiner* — Courtney D Heinle
*Assistant Examiner* — Danielle M. Christensen
(74) *Attorney, Agent, or Firm* — Oliff PLC

(57) ABSTRACT

A blade is used in fluid and includes: a base member; and a coat layer that is formed on the base member, a plurality of first grooves and a plurality of second grooves are formed on a surface of the coat layer, a pitch of the plurality of first grooves is different from a pitch of the plurality of second grooves.

20 Claims, 18 Drawing Sheets

(56) References Cited

U.S. PATENT DOCUMENTS

| | | |
|---|---|---|
| 2015/0377034 A1 | 12/2015 | Quitter |
| 2016/0362989 A1 | 12/2016 | Subramanian et al. |
| 2018/0066527 A1 | 3/2018 | Kadau et al. |
| 2020/0139488 A1 | 5/2020 | Jetter et al. |

FOREIGN PATENT DOCUMENTS

| | | |
|---|---|---|
| JP | 2007-182777 A | 7/2007 |
| JP | 2008-008248 A | 1/2008 |
| JP | 2009-504474 A | 2/2009 |
| WO | 2016/105327 A1 | 6/2016 |
| WO | 2018/197555 A1 | 11/2018 |

OTHER PUBLICATIONS

Jul. 21, 2020 Written Opinion issued in International Patent Application No. PCT/JP2020/017293.
Oct. 3, 2023 Office Action issued in Japanese Patent Application No. 2022-516541.
Jun. 4, 2024 Office Action issued in Japanese Patent Application No. 2022-516541.
Mar. 4, 2024 Search Report issued in European Patent Application No. 20 932 190.0.
Dec. 12, 2023 Partial Search Report issued in European Patent Applicaton No. 20932190.0.

* cited by examiner

BLADE, PROCESSING SYSTEM AND PROCESSING METHOD

TECHNICAL FIELD

The present invention relates to a blade such as a turbine blade and a processing apparatus system and a processing method for processing the blade, for example.

BACKGROUND ART

A turbine blade that is used by a turbine is one example of a blade. For example, a Patent Literature 1 discloses a turbine blade on a surface of which a heat resistant layer is formed. The blade such as the turbine blade is required to properly reduce a resistance of the blade to fluid.

CITATION LIST

Patent Literature

Patent Literature 1: EP2283169B

SUMMARY OF INVENTION

A first aspect provides a blade that is used in fluid, the blade including: a base member; and a coat layer that is formed on the base member, a plurality of first grooves and a plurality of second grooves being formed on a surface of the coat layer, a pitch of the plurality of first grooves being different from a pitch of the plurality of second grooves.

A second aspect provides a blade that is used for a fluid machinery, the blade including: a base member; and a coat layer that is formed on the base member, a plurality of first grooves and a plurality of second grooves being formed on a surface of the coat layer, a depth of the plurality of first grooves being different from a depth of the plurality of second grooves.

A third aspect provides a blade that is used in fluid, the blade including: a base member; and a coat layer that is formed on the base member, a plurality of first grooves and a plurality of second grooves being formed on a surface of the coat layer, an interval between the plurality of first grooves being different from an interval between the plurality of second grooves.

A fourth aspect provides a processing system including: a beam irradiation apparatus that is configured to irradiate a surface of a coat layer, which is formed on a base member and on which a plurality of second grooves are formed, with an energy beam; and a control apparatus that is configured to control the beam irradiation apparatus to form a plurality of first grooves on the surface of the coat layer at a pitch that is different from a pitch of the plurality of second grooves.

A fifth aspect provides a processing method including: forming a plurality of second grooves on a surface of a coat layer formed on a base member; and forming a plurality of first grooves on the surface of the coat layer at a pitch that is different from a pitch of the plurality of second grooves.

A sixth aspect provides a turbine blade that is used in fluid, the turbine blade including: a base member; and a heat resistant layer that is formed on the base member and by which a transmission of heat from the fluid to the base member is reducible, a riblet structure being formed on a second surface thereof opposite to a first surface thereof facing the base member.

A seventh aspect provides a processing system including: a beam irradiation apparatus that is configured to irradiate a surface of a heat resistant layer, which is formed on a base member and by which a transmission of heat from fluid to the base member is reducible, with an energy beam; and a control apparatus that is configured to control the beam irradiation apparatus to form a riblet structure on the surface of the heat resistant layer.

A eighth aspect provides a blade that is used in fluid, in which a riblet structure is formed on a surface of a base member, a coat layer is formed on the surface on which the riblet structure is formed.

A ninth aspect provides a blade that is used in fluid including: a base member on a surface of which a riblet structure is formed; and a coat layer that is formed on the surface on which the riblet structure is formed.

A tenth aspect provides a blade that is used in fluid including a base member, a plurality of first grooves that are arranged along a first pitch direction in a first segment on a surface of the base member and a plurality of second grooves that are arranged along a second pitch direction, which is different from the first pitch direction, in a second segment that is adjacent to the first segment on the surface of the base member being formed on the base member.

A eleventh aspect provides a blade that is used in fluid including: a base member; and a coat layer formed on the base member, a plurality of first grooves that are arranged along a first pitch direction in a first segment on a surface of the coat layer and a plurality of second grooves that are arranged along a second pitch direction, which is different from the first pitch direction, in a second segment that is adjacent to the first segment on the surface of the coat layer being formed on the coat layer.

A twelfth aspect provides a processing method including: forming a riblet structure on a surface of a base member; and forming a coat layer on the surface on which the riblet structure is formed.

DESCRIPTION OF EMBODIMENTS

Next, with reference to drawings, an example embodiment of a blade, a processing system and a processing method will be described. In the below described description, the example embodiment of the blade, the processing system and the processing method will be described by using a processing system SYS that is configured to perform a processing operation using a processing light EL. However, the present invention is not limited to the below described embodiment.

Moreover, in the below described description, a positional relationship of various components that constitute the processing system SYS will be described by using an XYZ rectangular coordinate system that is defined by a X axis, a Y axis and a Z axis that are perpendicular to one another. Note that each of an X axis direction and a Y axis direction is assumed to be a horizontal direction (namely, a predetermined direction in a horizontal plane) and a Z axis direction is assumed to be a vertical direction (namely, a direction that is perpendicular to the horizontal plane, and substantially an up-down direction), for the purpose of simple description, in the below described description. Moreover, rotational directions (in other words, inclination directions) around the X axis, the Y axis and the Z axis are referred to as a θX direction, a θY direction and a θZ direction, respectively. Here, the Z axis direction may be a gravity direction. An XY plane may be a horizontal direction.

(1) Configuration of Processing System SYS

Figure 1:
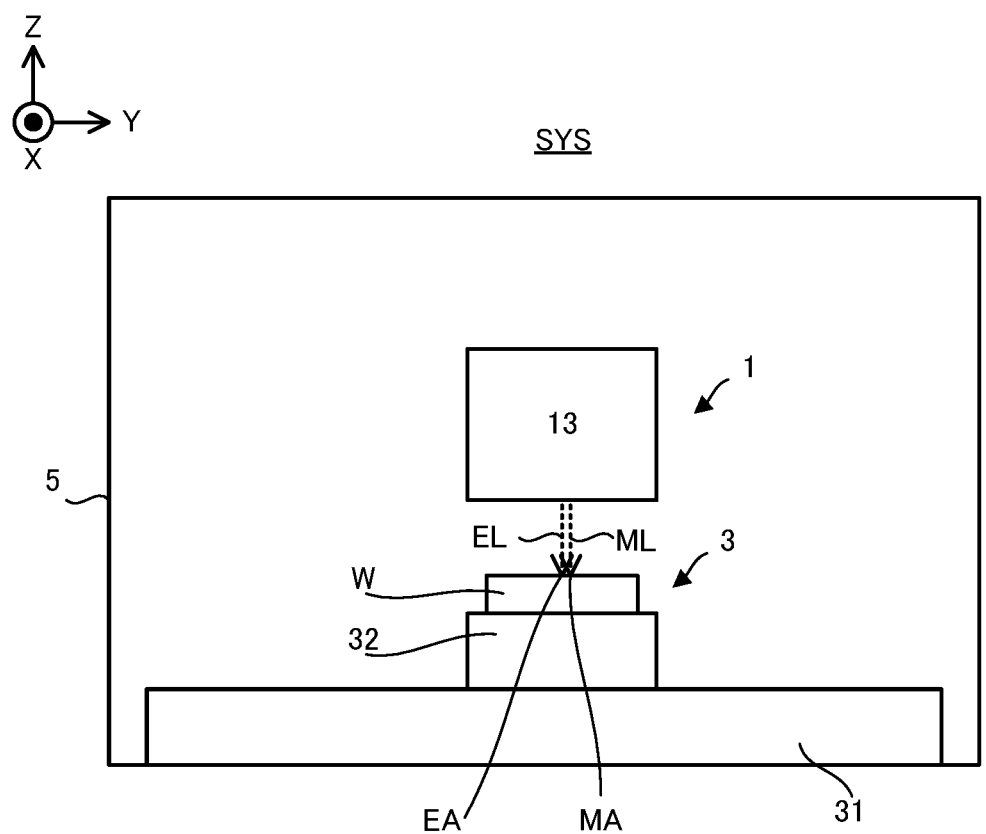
FIG. 1 is a cross-sectional view that conceptionally illustrates an entire configuration of a processing system in a present example embodiment.
Figure 2:
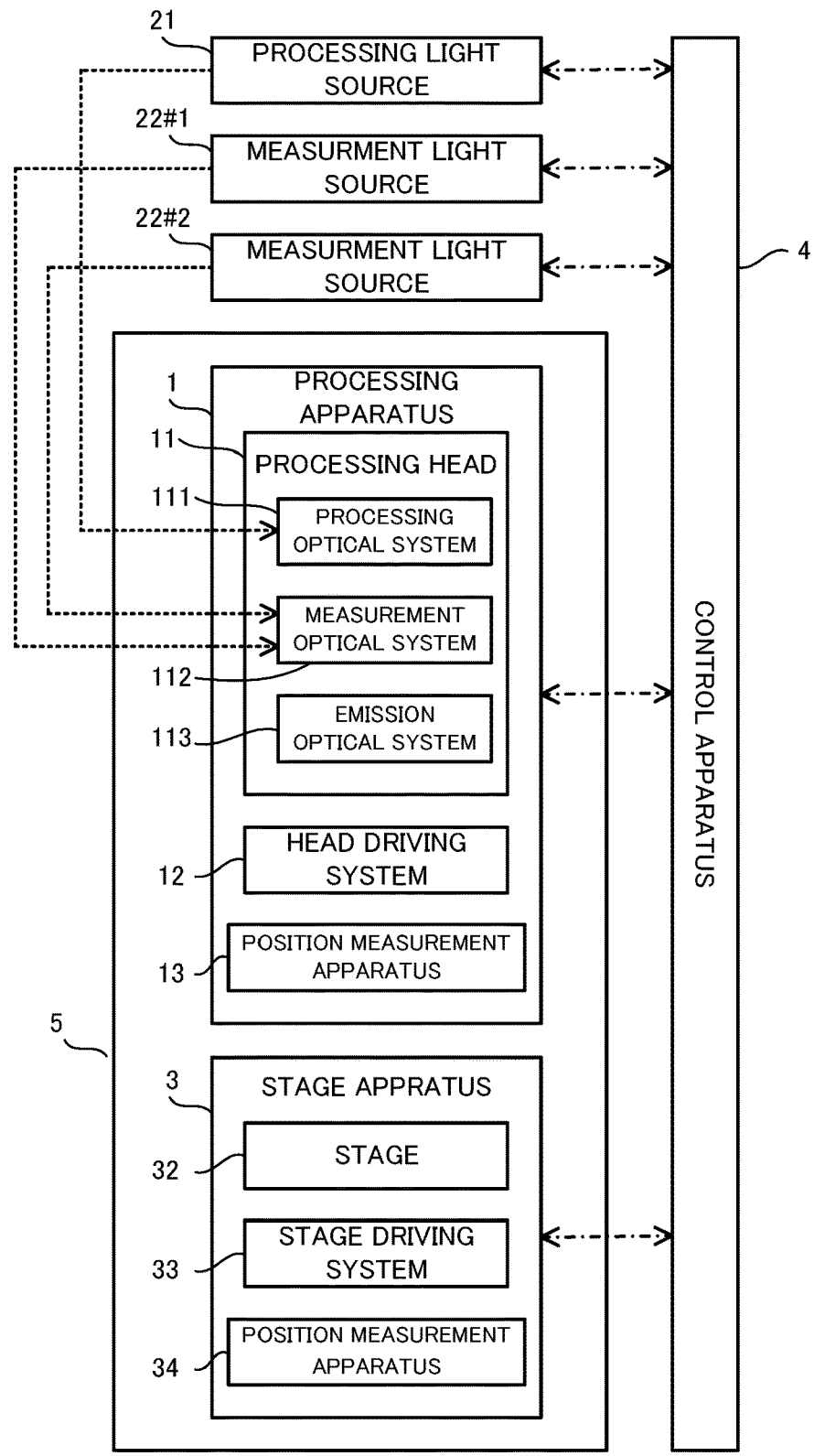
FIG. 2 is a system configuration diagram that illustrates a system configuration of the processing system in the present example embodiment.

Firstly, with reference to FIG. 1 and FIG. 2, a configuration of the processing system SYS in a present example embodiment will be described. FIG. 1 is a cross-sectional view that conceptionally illustrates the configuration of the processing system SYS in the present example embodiment. FIG. 2 is a system configuration diagram that illustrates a system configuration of the processing system SYS in the present example embodiment.

As illustrated in FIG. 1 and FIG. 2, the processing system SYS includes a processing apparatus 1, a processing light source 21, a measurement light source 22, a stage apparatus 3 and a control apparatus 4. At least a part of the processing apparatus 1 and the stage apparatus 3 are contained in an inner space in a housing 5. The inner space in the housing 5 may be purged by a purge gas such as a Nitrogen gas and so on, or may not be purged by the purge gas. The inner space in the housing may be vacuumed or may not be vacuumed. However, thee processing apparatus 1 and the stage apparatus 3 may not be housed in the inner space in the housing 5. Namely, the processing system SYS may not include the housing 5 for containing the processing apparatus 1 and the stage apparatus 3.

The processing apparatus 1 is configured to process the workpiece W, which is a processing target, under the control of the control apparatus 4. The workpiece W may be a metal, may be an alloy (for example, a duralumin and the like), may be a semiconductor, may be a resin, may be a composite material (for example, at least one of a CFRP (Carbon Fiber Reinforced Plastic), a painting material (as one example a film of painting material that is coated on a base member) and the like), may be a glass or may be an object that is made from any other material, for example.

Figure 3:
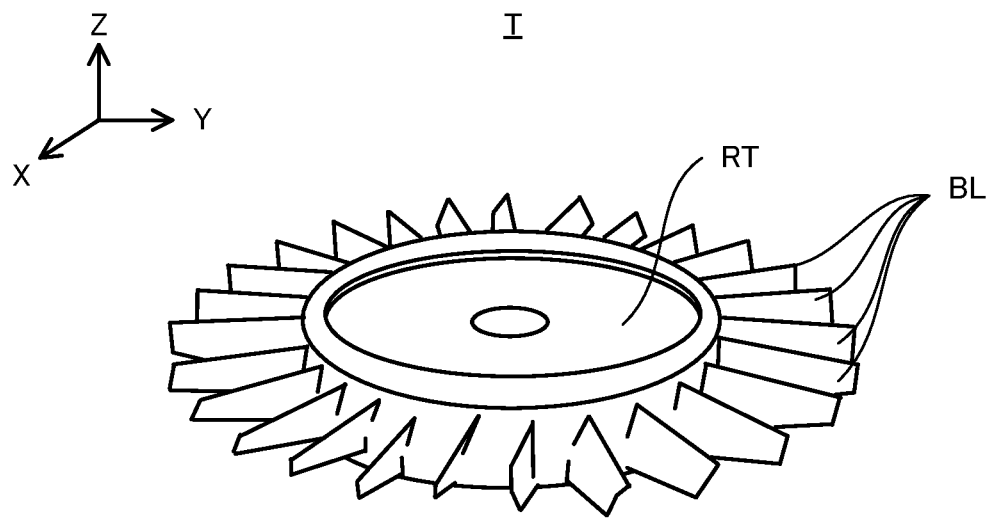
FIG. 3 is a perspective view that illustrates an exterior appearance of a turbine.
Figure 4:
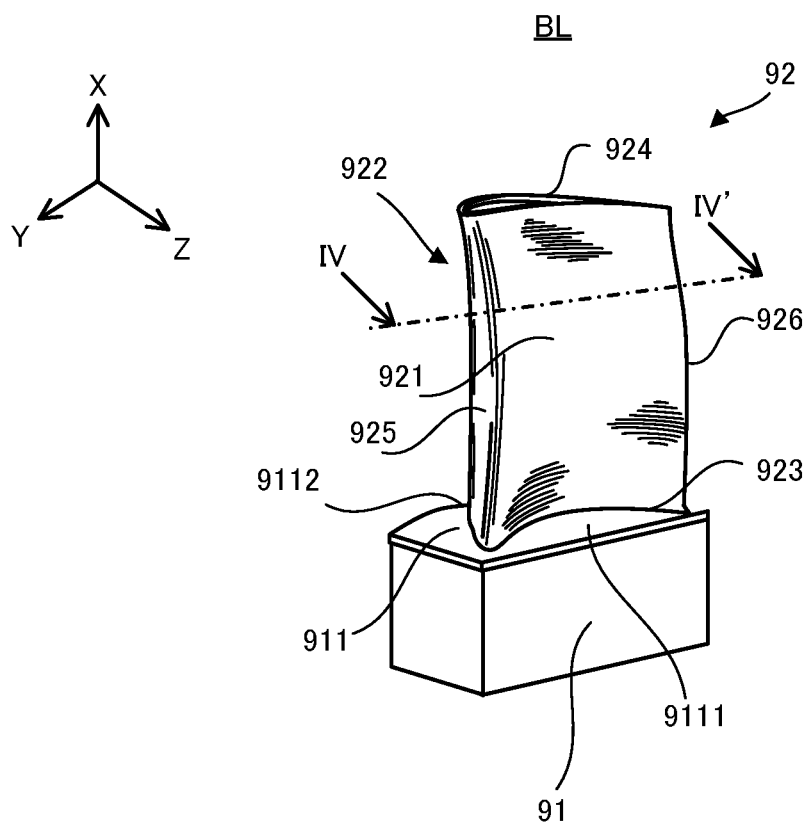
FIG. 4 is a perspective view that illustrates an exterior appearance of a turbine blade.

In the present example embodiment, the processing apparatus 1 may process a turbine blade BL that is one example of the workpiece W. The turbine blade BL is a member that is used for a turbine T that is one example of a fluid machinery. Specifically, the turbine blade BL is a blade-shaped member that serve as a blade of the turbine T. FIG. 3 and FIG. 4 illustrate one example of the turbine T. FIG. 3 is a perspective view that illustrates an exterior appearance of the turbine T. FIG. 4 is a perspective view that illustrates an exterior appearance of the turbine blade BL. As illustrated in FIG. 3 and FIG. 4, the turbine T includes a plurality of turbine blades BL. The turbine blade BL includes: a shank 91; and a blade body 92 that is connected to the shank 91 and that extends outwardly along radial direction of the turbine T. At least one of the shank 91 and the blade body 92 may be formed by a single metal. At least one of the shank 91 and the blade body 92 may be formed by a plurality of metals.

At least one of the shank 91 and the blade body 92 may be manufactured by an existing manufacturing method (for example, a manufacturing using at least one of a molding, a forging, an additive processing, a removal processing and a machine processing). Alternatively, the shank 91 and the blade body 92, which are manufactured separately, may be jointed with each other by an existing coupling method (for example, a jointing method using at least one of a welding, a brazing, an adhesive bonding and so on). The plurality of shanks 91 which the plurality of turbine blades BL include, respectively, may not be jointed with each other. The plurality of shanks 91 jointed with each other may constitute at least a part of a rotatable rotor RT The blade body 92 extends outwardly from a platform 911 of the shank 91 along the radial direction of the turbine T. The platform 911 includes a positive pressure side platform 9111 and a negative pressure side platform 9112. The blade body 92 includes: a positive pressure surface 921; a negative pressure surface 922 that faces toward a side opposite to a side toward which the positive pressure surface 921 faces, a root part 923 that is jointed with the shank 91; and a tip part 924 that constitute an end part located at a side opposite to the root part 923. The blade body 92 further includes: a leading edge surface 925 that is located between the positive pressure surface 921 and the negative pressure surface 922; and a trailing edge surface 926 that is located between the positive pressure surface 921 and the negative pressure surface 922 at a side opposite to the leading edge surface 925. At least one surface of the positive pressure surface 921, the negative pressure surface 922, the leading edge surface 925 and the trailing edge surface 926 may include a curved surface. For example, in an example illustrated in FIG. 4, a surface of each of the positive pressure surface 921 and the negative pressure surface 922 includes the curved surface.

Note that the turbine T may be an object in which the rotor RT and the turbine blade BL are integrally formed.

The turbine T is rotatable by using a flow of a fluid that is supplied to the turbine T. Specifically, the fluid (for example, at least one of a water, a steam, an air and a gas) is supplied to the turbine T. The fluid that has been supplied to the turbine T flows along the surface of each of the plurality of turbine blades BL. Thus, the turbine blade BL is used in the fluid. As a result, a kinetic energy of the fluid is converted into a rotational energy of the turbine T by the plurality of turbine blades BL. At least one of a steam turbine using the steam as the fluid and a gas turbine using the gas as the fluid is one example of the turbine T. At least one of a hydraulic turbine using the water as the fluid and a wind turbine using the air as the fluid is another example of the turbine T. Moreover, the turbine T may generate the flow of the fluid by its rotation.

Figure 5:
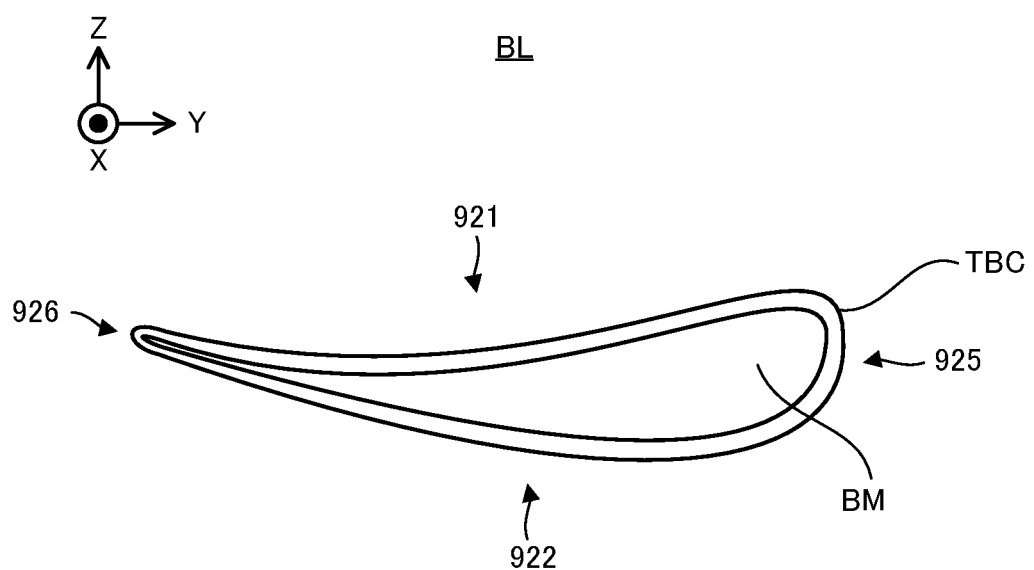
FIG. 5 is a cross-sectional view that illustrates a configuration of the turbine blade.

There is a high possibility that a temperature of the fluid supplied to the turbine blade BL is high. For example, when the turbine blade BL is used for a jet engine (namely, the turbine blade BL is used for the gas turbine), a high-temperature fuel gas is suppled as the fluid to the turbine blade BL. In this case, a heat resistant processing may be performed on the turbine blade BL in order to reduce an influence of a base member BM of the turbine blade BL from the heat. Specifically, as illustrated in FIG. 5 that is a cross-sectional view that illustrates a configuration of the turbine blade BL (a IV-VI' cross-sectional view of FIG. 4), the turbine blade BL includes the base member BM and a heat resistant layer TBC formed on a surface of the base member BM. The heat resistant layer TBC is formed on a part of the surface of the base member BM that is affected by the heat from the fluid. The heat resistant layer TBC is a coated layer for reducing a transmission of the heat from the fluid to the base member BM. Thus, the turbine blade BL contacts with the fluid through the heat resistant layer TBC when the turbine blade BL is used (namely, in a period during which the fluid is supplied to the turbine blade BL). Namely, the heat resistant layer TBC (more specifically, a surface of the heat resistant layer TBC opposite to a surface facing the base member BM, and an exposed surface of the heat resistant layer TBC) contacts with the fluid when the turbine blade BL is used. As a result, the heat resistant layer TBC existing between the fluid and the base member BM reduces the transmission of the heat from the fluid to the base member BM. Thus, the influence of the base member BM from the heat is reduced. A layer including a ceramic is one example of the heat resistant layer TBC. The layer including the ceramic may be a layer formed by a porous material, for example.

Incidentally, in an example illustrated in FIG. 5, since each of the positive pressure surface 921 and the negative pressure surface 922 includes the curved surface as described above, the surfaces of the base member BM and the heat resistant layer TBC also include curved surfaces. Namely, the surface of the base member BM facing the heat resistant layer TBC incudes the curved surface. The exposed surface of the heat resistant layer TBC also includes the curved surface. However, the surfaces of the base member BM and the heat resistant layer TBC may include the curved surfaces or may not include the curved surface, regardless of the positive pressure surface 921 and the negative pressure surface 922 including the curved surfaces. Note that the curved surface may be a curved surface such as a part of a cylinder in which a curvature of each point on the surface varies along only one direction, or may be a curved surface such as a part of a sphere in which a curvature of each point on the surface varies along two directions. The surfaces of the base member BM and the heat resistant layer TBC may be planar surfaces.

Again in FIG. 1 and FIG. 2, the processing apparatus 1 irradiates the workpiece W with the processing light EL in order to process the workpiece W. Thus, the processing apparatus 1 may be referred to as a beam irradiation apparatus. The processing light EL may be any type of light, as long as the workpiece W is processed by irradiating the workpiece W with it. In the present example embodiment, an example in which the processing light EL is a laser light will be described, however, the processing light EL may be a light that is different from the laser light. Furthermore, a wavelength of the processing light EL may be any wavelength, as long as the workpiece W is processed by irradiating the workpiece W with it. For example, the processing light EL may be a visible light, or may be an invisible light (for example, at least one of an infrared light, an ultraviolet light, an extreme ultraviolet light and the like). The processing light EL may include a pulsed light (for example, a pulsed light an ON time of which is equal to or shorter than pico-seconds). Alternatively, the processing light EL may not include the pulsed light. In other words, the processing light EL may be a continuous light.

The processing apparatus 1 may perform a removal processing (typically, a cutting processing or a grinding processing) for removing a part of the workpiece W by irradiating the workpiece W with the processing light EL. When the removal processing is performed, the processing apparatus 1 may form a riblet structure RB, which will be described later in detail with reference to FIG. 8A to FIG. 8C, on the workpiece W. The riblet structure RB is a structure by which a resistance (especially, a frictional resistance, a turbulent frictional resistance) of the surface of the workpiece W to fluid is reducible. Note that the fluid here means any medium (for example, at least one of a gas and a liquid) that flows relative to the surface of the workpiece W. For example, the medium may be referred to as the fluid when the surface of workpiece W moves relative to the medium although the medium itself is static.

The processing apparatus 1 may perform an additive processing for adding new structural object to the workpiece W by irradiating the workpiece W with the processing light EL, in addition to or instead of the removal processing. In this case, the processing apparatus 1 may form the above described riblet structure RB on the surface of the workpiece W by performing the additive processing. Alternatively, the processing apparatus 1 may perform a machine processing for processing the workpiece W by contacting a tool with the workpiece W, in addition to or instead of at least one of the removal processing and the additive processing. In this case, the processing apparatus 1 may form the above described riblet structure RB on the surface of the workpiece W by performing the machine processing.

The processing light EL is supplied to the processing apparatus 1 from the processing light source 21, which is a generation source configured to generate the processing light EL, through a non-illustrated light transmission member (for example, at least one of an optical fiber and a mirror). The processing apparatus 1 irradiates the workpiece W with the processing light EL supplied from the processing light source 21.

Furthermore, the processing apparatus 1 is configured to measure the workpiece W under the control of the control apparatus 4. The processing apparatus 1 irradiates the workpiece W with a measurement light ML in order to measure the workpiece W. The measurement light ML may be any type of light, as long as the workpiece W is measurable by irradiating the workpiece W with it. In the present example embodiment, an example in which the measurement light ML is a laser light will be described, however, the measurement light 20) ML may be a light that is different from the laser light. Furthermore, a wavelength of the measurement light ML may be any wavelength, as long as the workpiece W is measurable by irradiating the workpiece W with it. For example, the measurement light ML may be a visible light, or may be an invisible light (for example, at least one of an infrared light, an ultraviolet light, an extreme ultraviolet light and the like). The measurement light ML may include a pulsed light (for example, a pulsed light an ON time of which is equal to or shorter than pico-seconds). Alternatively, the measurement light ML may not include the pulsed light. In other words, the measurement light ML may be a continuous light.

The wavelength of the measurement light ML may be different from the wavelength of the processing light EL. For example, the wavelength of the measurement light ML may be shorter than the wavelength of the processing light EL. As one example, a light in a wavelength range of 266 nm or 355 nm may be used as the measurement light ML and a light in a wavelength range of 532 nm, 1 μm or 10 μm may be used as the processing light EL. In this case, a diameter of a spot of the measurement light ML on the workpiece W is smaller than a diameter of a spot of the processing light EL on the workpiece W. As a result, a measurement resolution by the measurement light ML is higher than a processing resolution by the processing light EL. However, the wavelength of the measurement light ML may not be shorter than the wavelength of the processing light EL. The wavelength of the measurement light ML may be same as the wavelength of the processing light EL.

The measurement light ML is supplied to the processing apparatus 1 from the measurement light source 22, which is a generation source configured to generate the measurement light ML, through a non-illustrated light transmission member (for example, at least one of an optical fiber and a mirror). The processing apparatus 1 irradiates the workpiece W with the measurement light ML supplied from the measurement light source 22.

In the present example embodiment, the measurement light source 22 may include a light comb light source. The light comb light source is a light source that is configured to generate, as the pulsed light, a light including frequency components that are arranged with equal interval on a frequency axis (hereinafter, it is referred to as a "light frequency comb"). In this case, the measurement light source 22 emits, as the measurement light ML, the pulsed light including the frequency components that are arranged with equal interval on the frequency axis. However, the measurement light source 22 may include a light source that is different from the light comb light source.

In an example illustrated in FIG. 2, the processing system SYS includes a plurality of measurement light sources 22. For example, the processing system SYS includes the measurement light source 22 #1 and the measurement light source 22 #2. The plurality of measurement light sources 22 emit a plurality of measurement lights ML whose phases are synchronized with each other and that are coherent, respectively. For example, oscillation frequencies of the plurality of measurement light sources 22 may be different. Thus, the plurality of measurement lights ML respectively emitted from the plurality of measurement light sources 22 are the plurality of measurement lights ML having different pulse frequencies (for example, the number of the pulsed light per unit time, and an inverse number of an emission cycle of the pulsed light). As one example, the measurement light source 22 #1 may emit the measurement light ML #1 whose pulse frequency is 25 GHz and the measurement light source 22 #2 may emit the measurement light ML #2 whose pulse frequency is 25 GHz+α (for example, +100 Hz). However, the processing system SYS may include a single measurement light source 22.

The processing apparatus 1 may be configured to measure a state of the workpiece W. The state of the workpiece W may include a position of the workpiece W. The position of the workpiece W may include a position of the surface of the workpiece W. The position of the surface of the workpiece W may include a position of each surface part, which is obtained by segmentalizing the surface of the workpiece W, in at least one of the X axis direction, the Y axis direction and the Z axis direction. The position of the surface of the workpiece W may include a position of each surface part, which is obtained by segmentalizing the surface of the workpiece W, in at least one of the θX direction, the θY direction and the θZ direction. Note that it may be regarded that the position of each surface part in at least one of the θX direction, the θY direction and the θZ direction may be equivalent to an attitude of each surface part (namely, a direction of each surface part (for example, a direction of a normal line of each surface part), and it is substantially equivalent to an inclined amount of each surface part with respect to at least one of the X axis, the Y axis and the Z axis). In this case, it can be said that the state of the workpiece W may include the shape (for example, a three-dimensional shape) of the workpiece W. Moreover, the state of the workpiece W may include a size (for example, a size in at least one of the X axis direction, the Y axis direction and the Z axis direction) of the workpiece W.

In order to process and measure the workpiece W, the processing apparatus 1 includes: a processing head 11 that emits each of the processing light EL and the measurement light ML to the workpiece W; a head driving system 12 that moves the processing head 11; and a position measurement apparatus 13. Furthermore, the processing head 11 includes a processing optical system 111, a measurement optical system 112 and an emission optical system 113. Note that a configuration of the processing head 11 will be described later in detail.

The head driving system 12 moves the processing head 11 along at least one of the X axis, the Y axis and the Z axis under the control of the control apparatus 4. Note that the head driving system 12 may move the processing head 11 along at least one of the θX direction, the θY direction and the θZ direction, in addition to or instead of at least one of the X axis, the Y axis, the Z axis.

When the processing head 11 moves, a positional relationship between a stage 32 (furthermore, the workpiece W placed on the stage 32) and the processing head 11 changes. Namely, when the stage 32 moves, a relative position between the processing head 11 and each of the stage 32 and the workpiece W changes. Furthermore, when the positional relationship between the processing head 11 and each of the stage 32 and the workpiece W changes, a positional relationship between each optical system (namely, at least one of the processing optical system 111, the measurement optical system 112 and the emission optical system 113) of the processing head 11 and each of the stage 32 and the workpiece W changes. Furthermore, when the positional relationship between the processing head 11 and each of the stage 32 and the workpiece W changes, an irradiation position of each of the processing light EL and the measurement light ML on the workpiece W changes.

The position measurement apparatus 13 is a sensor that is configured to measure a position of the processing head 11. The position measurement apparatus 13 may include at least one of an encoder and a laser interferometer, for example. The control apparatus 4 may move the processing head 11 based on a measured result by the position measurement apparatus 13. The control apparatus 4 may change the positional relationship between the processing head 11 and each of the stage 32 and the workpiece W based on the measured result by the position measurement apparatus 13.

The stage apparatus 3 includes a surface plate 31, a stage 32, a stage driving system 33 and a position measurement apparatus 34. The surface plate 31 is placed on a non-illustrated support surface. The stage 32 is placed on the surface plate 31. A non-illustrated vibration isolator that reduces a transmission of vibration from the surface plate 31 to the stage 32 may be disposed between the surface plate 31 and the support surface.

The workpiece W is placed on the stage 32. The stage 32 may hold the placed workpiece W. For example, the stage 32 may hold the workpiece W by vacuum-sucking and/or electrostatically sucking the workpiece W. Alternatively, the stage 32 may not hold the placed workpiece W.

The stage driving system 33 moves the stage 32 under the control of the control apparatus 4. Specifically, the stage driving system 33 moves the stage 32 relative to at least one of surface plate 31 and the processing apparatus 1. For example, the stage driving system 33 may move the stage 32 along at least one of the X axis, the Y axis, the Z axis, the θX direction, the θY direction and the θZ direction under the control of the control apparatus 4.

processing head 11 along at least one of the X axis, the Y axis, the Z axis. Note that the head driving system 12 may move the processing head 11 along at least one of the θX direction, the θY direction and the θZ direction, in addition to or instead of at least one of the X axis, the Y axis, the Z axis.

When the stage 32 moves, the positional relationship between the stage 32 (furthermore, the workpiece W placed on the stage 32) and the processing head 11 changes. Furthermore, when the positional relationship between the processing head 11 and each of the stage 32 and the workpiece W changes, the positional relationship between each optical system of the processing head 11 and each of the stage 32 and the workpiece W changes. Furthermore, when the positional relationship between the processing head 11 and each of the stage 32 and the workpiece W changes, the irradiation position of each of the processing light EL and the measurement light ML on the workpiece W changes.

The position measurement apparatus 34 is a sensor that is configured to measure a position of the stage 32. The position measurement apparatus 34 may include at least one of an encoder and a laser interferometer, for example. The control apparatus 4 may move the stage 32 based on a measured result by the position measurement apparatus 34. The control apparatus 4 may change the positional relationship between the processing head 11 and each of the stage 32 and the workpiece W based on the measured result by the position measurement apparatus 34.

The control apparatus 4 controls the operation of the processing system SYS. For example, the control apparatus 4 sets a processing condition of the workpiece W and controls the processing apparatus 1 and the stage apparatus 3 so that the workpiece W is processed based on the set processing condition. For example, the control apparatus 4 sets a measurement condition of the workpiece W and controls the processing apparatus 1 and the stage apparatus 3 so that the workpiece W is measured based on the set measurement condition.

The control apparatus 4 may include an arithmetic apparatus and a storage apparatus, for example. The arithmetic apparatus may include at least one of a CPU (Central Processing Unit) and a GPU (Graphical Processing Unit), for example. The control apparatus 4 serves as an apparatus for controlling the operation of the processing system SYS by means of the arithmetic apparatus executing a computer program. The computer program is a computer program that allows the control apparatus 4 (for example, the arithmetic apparatus) to execute (namely, to perform) a below described operation that should be executed by the control apparatus 4. Namely, the computer program is a computer program that allows the control apparatus 4 to function so as to make the processing system SYS execute the below described operation. The computer program executed by the arithmetic apparatus may be recorded in the memory (namely, a recording medium) of the control apparatus 4, or may be recorded in any recording medium (for example, a hard disk or a semiconductor memory) that is built in the control apparatus 4 or that is attachable to the control apparatus 4. Alternatively, the arithmetic apparatus may download the computer program that should be executed from an apparatus disposed at the outside of the control apparatus 4 through a network interface.

The control apparatus 4 may not be disposed in the processing system SYS, and may be disposed at the outside of the processing system SYS as a server or the like. In this case, the control apparatus 4 may be connected to the processing system SYS through a wired and/or wireless network (alternatively, a data bus and/or a communication line). A network using a serial-bus-type interface such as at least one of IEEE1394, RS-232x, RS-422, RS-423, RS-485 and USB may be used as the wired network. A network using a parallel-bus-type interface may be used as the wired network. A network using an interface that is compatible to Ethernet (a registered trademark) such as at least one of 10-BASE-T, 100BASE-TX or 1000BASE-T may be used as the wired network. A network using an electrical wave may be used as the wireless network. A network that is compatible to IEEE802.1x (for example, at least one of a wireless LAN and Bluetooth (registered trademark)) is one example of the network using the electrical wave. A network using an infrared ray may be used as the wireless network. A network using an optical communication may be used as the wireless network. In this case, the control apparatus 4 and the processing system SYS may be configured to transmit and receive various information through the network. Moreover, the control apparatus 4 may be configured to transmit information such as a command and a control parameter to the processing system SYS through the network. The processing system SYS may include a receiving apparatus that receives the information such as the command and the control parameter from the control apparatus 4 through the network. Alternatively, a first control apparatus that performs a part of the processing performed by the control apparatus 4 may be disposed in the processing system SYS and a second control apparatus that performs another part of the processing performed by the control apparatus 4 may be disposed at the outside of the processing system SYS.

Note that the recording medium recording therein the computer program that should be executed by the arithmetic apparatus may include an optical disc such as a CD-ROM, a CD-R, a CD-RW, a flexible disc, a MO, a DVD-ROM, a DVD-RAM, a DVD-R, a DVD+R, a DVD-RW, a DVD+RW and a Blu-ray (registered trademark), a magnetic disc such as a magnetic tape, an optical-magnetic disc, a semiconductor memory such as a USB memory, and another medium that is configured to store the program. The recording medium may include a device that is configured to record the computer program (for example, a device for a universal use or a device for an exclusive use in which the computer program is embedded to be executable in a form of at least one of a software, a firmware and the like). Moreover, each process or function included in the computer program may be realized by a logical process block that is realized in the control apparatus 4 by means of the control apparatus 4 (namely, a computer) executing the computer program, may be realized by a hardware such as a predetermined gate array (a FPGA, an ASIC) of the control apparatus 4, or may be realized in a form in which the logical process block and a partial hardware module that realizes an partial element of the hardware are combined.

(1-2) Configuration of Processing Head 11

Figure 6:
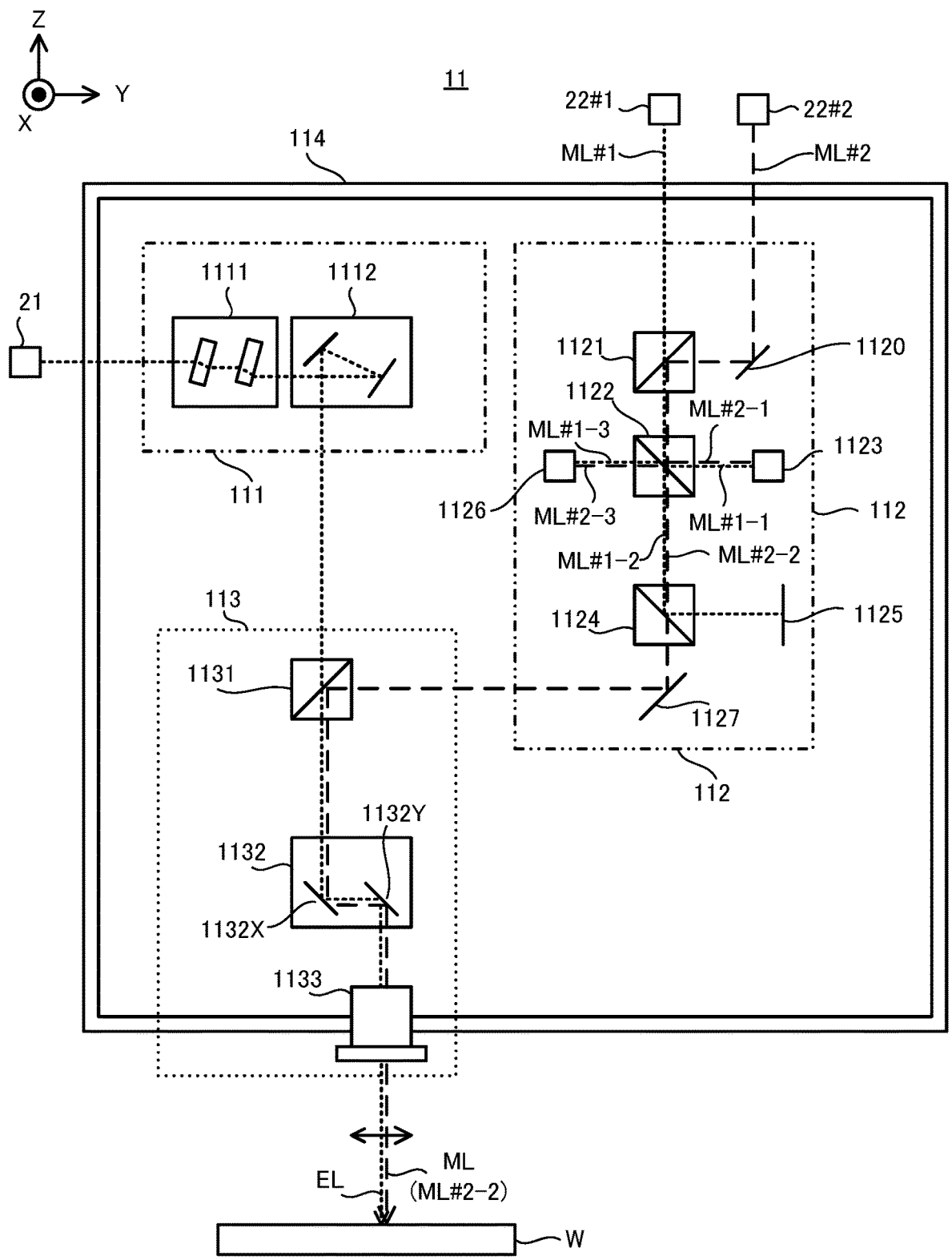
FIG. 6 is a cross-sectional view that illustrates a configuration of a processing head in the present example embodiment.

Next, with reference to FIG. 6, one example of the configuration of the processing head 11 will be described. FIG. 6 is a cross-sectional view that illustrates one example of the configuration of the processing head 11.

As illustrated in FIG. 6, the processing head 11 includes the processing optical system 111, the measurement optical system 112 and the emission optical system 113. The processing optical system 111, the measurement optical system 112 and the emission optical system 113 are housed in the housing 114. However, at least one of the processing light source 21, the processing optical system 111, the measurement optical system 112 and the emission optical system 113 may not be housed in the housing 114.

The processing optical system 111 is an optical system to which the processing light EL emitted from the processing light source 21 enters. The processing optical system 111 is an optical system that emits, toward the emission optical system 113, the processing light EL entering the processing optical system 111. Namely, The processing optical system 111 is an optical system that guides the processing light EL emitted from the processing light source 21 to the emission optical system 113. The workpiece W is irradiated with the processing light EL emitted from the processing optical system 111 through the emission optical system 113.

The processing optical system 111 includes a position adjustment optical system 1111 and an angle adjustment optical system 1112. The position adjustment optical system 1111 is configured to adjust an emitting position of the processing light EL from the processing optical system 111. The position adjustment optical system 1111 includes a parallel plate that is configured to incline with respect to a propagating direction of the processing light EL, for example, and changes a position of the processing light EL by changing an inclined angle of the parallel plate. The angle adjustment optical system 1112 is configured to adjust an emitting angle of the processing light EL from the processing optical system 111. The angle adjustment optical system 1112 includes a mirror that is configured to incline with respect to the propagating direction of the processing light EL, for example, and changes the emitting angle of the processing light by changing an inclined angle of the mirror. However, the processing optical system 111 may not include at least one of the position adjustment optical system 1111 and the angle adjustment optical system 1112. The processing optical system 111 may include another optical element or optical member, in addition to or instead of at least one of the position adjustment optical system 1111 and the angle adjustment optical system 1112.

The processing light EL emitted from the processing optical system 111 enters the emission optical system 113. The emission optical system 113 includes a beam splitter (for example, a polarized beam splitter) 1131, a Galvano mirror 1132 and a fθ lens 1133.

The beam splitter 1131 emits, toward the Galvano mirror 1132, the processing light EL entering the beam splitter 1131. In the example illustrated in FIG. 6, the processing light EL entering the beam splitter 1131 passes through a polarization split surface to be emitted toward the Galvano mirror 1132. Thus, in the example illustrated in FIG. 6, the processing light EL enters the polarization split surface of the beam splitter 1131 in a state where it has a polarized direction by which it is allowed to pass through the polarization split surface (a polarized direction by which it is a p-polarized light with respect to the polarization split surface).

The processing light EL emitted from the emission optical system 113 enters the Galvano mirror 1132. The Galvano mirror 1132 changes the irradiation position of the processing light EL on the workpiece W by deflecting the processing light EL (namely, by changing the emitting angle of the processing light EL). For example, the Galvano mirror 1132 includes a X scanning mirror 1132X and a Y scanning mirror 1132Y. Each of the X scanning mirror 1132X and the Y scanning mirror 1132Y is an inclined angle variable mirror whose angle relative to the optical path of the processing light EL entering the Galvano mirror 1132 is changed. The X scanning mirror 1132X deflects the processing light EL by swinging or rotating (namely, changing the angle of the X scanning mirror 1132X relative to the optical path of the processing light EL) so as to change the irradiation position along the X axis direction of the processing light EL on the workpiece W. The Y scanning mirror 1132Y deflects the processing light EL by swinging or rotating (namely, changing the angle of the Y scanning mirror 1132Y relative to the optical path of the processing light EL) so as to change the irradiation position along the Y axis direction of the processing light EL on the workpiece W.

The processing light EL emitted from the Galvano mirror 1132 enters the fθ lens 1133. The fθ lens 1133 is an optical system for irradiating the workpiece W with the processing light EL from the Galvano mirror 1132. Especially, the fθ lens 1133 is an optical system for condensing the processing light EL from the Galvano mirror 1132 on the workpiece W. Thus, the fθ lens 1133 irradiates the workpiece W with the processing light EL in a converged state. As a result, the workpiece W is processed by the processing light EL.

The measurement optical system 112 is an optical system to which the measurement light ML emitted from the measurement light source 22 enters. The measurement optical system 112 is an optical system that emits, toward the emission optical system 113, the measurement light ML entering the measurement optical system 112. Namely, The measurement optical system 112 is an optical system that guides the measurement light ML emitted from the measurement light source 22 to the emission optical system 113. The workpiece W is irradiated with the measurement light ML emitted from the measurement optical system 112 through the emission optical system 113.

The measurement optical system 112 includes a mirror 1120, a beam splitter 1121, a beam splitter 1122, a detector 1123, a beam splitter 1124, a mirror 1125, a detector 1126 and a mirror 1127, for example.

The measurement light ML emitted from the measurement light source 22 enters the beam splitter 1121. Specifically, the measurement light ML emitted from the measurement light source 22 #1 (hereinafter, it is referred to as the "measurement light ML #1") enters the beam splitter 1121. The measurement light ML emitted from the measurement light source 22 #2 (hereinafter, it is referred to as the "measurement light ML #2") enter the beam splitter 1121 through the mirror 1120. The beam splitter 1121 emits, toward the beam splitter 1122, the measurement lights ML #1 and ML #2 entering the beam splitter 1121.

The beam splitter 1122 reflects, toward the detector 1123, a measurement light ML #1-1 that is a part of the measurement light ML #1 entering the beam splitter 1122. The beam splitter 1122 emits, toward the beam splitter 1124, a measurement light ML #1-2 that is another part of the measurement light ML #1 entering the beam splitter 1122. The beam splitter 1122 reflects, toward the detector 1123, a measurement light ML #2-1 that is a part of the measurement light ML #2 entering the beam splitter 1122. The beam splitter 1122 emits, toward the beam splitter 1124, a measurement light ML #2-2 that is another part of the measurement light ML #2 entering the beam splitter 1122.

The measurement lights ML #1-1 and ML #2-1 emitted from the beam splitter 1122 enter the detector 1123. The detector 1123 detects an interfering light generated by an interference between the measurement light ML #1-1 and the measurement light ML #2-1. Specifically, the detector 1123 detects the interfering light by optically receiving the interfering light. Thus, the detector 1123 may include a light reception element (a light reception part and typically a photoelectron conversion element) that is configured to optically receive a light. A detected result by the detector 1123 is outputted to the control apparatus 4.

The measurement lights ML #1-2 and ML #2-2 emitted from the beam splitter 1122 enter the beam splitter 1124. The beam splitter 1124 reflects, toward the mirror 1125, at least a part of the measurement light ML #1-2 entering the beam splitter 1124. The beam splitter 1124 reflects, toward the mirror 1127, at least a part of the measurement light ML #2-2 entering the beam splitter 1124.

The measurement light ML #1-2 emitted from the beam splitter 1124 enters the mirror 1125. The measurement light ML #1-2 entering the mirror 1125 is reflected by a reflection surface (the reflection surface may be referred to as a reference surface) of the mirror 1125. Specifically, the mirror 1125 reflects, toward the beam splitter 1124, the measurement light ML #1-2 entering the mirror 1125. Namely, the mirror 1125 emits the measurement light ML #1-2, which enters the mirror 1125, toward the beam splitter 1124 as a measurement light ML #1-3 that is a reflection light thereof. The measurement light ML #1-3 emitted from the mirror 1125 enters the beam splitter 1124. The beam splitter 1124 emits, toward the beam splitter 1122, the measurement light ML #1-3 entering the beam splitter 1124. The measurement light ML #1-3 emitted from the beam splitter 1124 enters the beam splitter 1122. The beam splitter 1122 emits, toward the detector 1126, the measurement light ML #1-3 entering the beam splitter 1122.

On the other hand, the measurement light ML #2-2 emitted from the beam splitter 1124 enters the mirror 1127. The mirror 1127 reflects, toward the emission optical system 113, the measurement light ML #2-2 entering the mirror 1127. Namely, the mirror 1127 emits, toward the emission optical system 113, the measurement light ML #2-2 entering the mirror 1127.

The measurement light ML #2-2 emitted from the mirror 1127 enters the emission optical system 113. The beam splitter 1131 of the emission optical system 113 emits, toward the Galvano mirror 1132, the measurement light ML #2-2 entering the beam splitter 1131. In the example illustrated in FIG. 4, the measurement light ML #2-2 entering the beam splitter 1131 is reflected by the polarization split surface to be emitted toward the Galvano mirror 1132. Thus, in the example illustrated in FIG. 4, the measurement light ML #2-2 enters the polarization split surface of the beam splitter 1131 in a state where it has a polarized direction by which it is allowed to be reflected by the polarization split surface (a polarized direction by which it is a s-polarized light with respect to the polarization split surface).

Here, not only the measurement light ML #2-2 but also the processing light EL enter the beam splitter 1131 as described above. Namely, both of the measurement light ML #2-2 and the processing light EL pass through the beam splitter 1131. The beam splitter 1131 emits, toward same direction (namely, toward the same Galvano mirror 1132), the processing light EL and the measurement light ML #2-2 that respectively enter the beam splitter 1131 from different directions. Therefore, the beam splitter 1131 substantially serves as a combining optical system that combines the processing light EL and the measurement light ML #2-2.

The measurement light ML #2-2 emitted from the emission optical system 113 enters the Galvano mirror 1132. The Galvano mirror 1132 changes the irradiation position of the measurement light ML #2-2 on the workpiece W by deflecting the measurement light ML #2-2. For example, the X scanning mirror 1132X deflects the measurement light ML #2-2 by swinging or rotating (namely, changing the angle of the X scanning mirror 1132X relative to the optical path of the measurement light ML #2-2) so as to change the irradiation position along the X axis direction of the measurement light ML #2-2 on the workpiece W. The Y scanning mirror 1132Y deflects the measurement light ML #2-2 by swinging or rotating (namely, changing the angle of the Y scanning mirror 1132Y relative to the optical path of the measurement light ML #2-2) so as to change the irradiation position along the Y axis direction of the measurement light ML #2-2 on the workpiece W.

The measurement light ML #2-2 emitted from the Galvano mirror 1132 enters the fθ lens 1133. The fθ lens 1133 is an optical system for condensing the measurement light ML #2-2 from the Galvano mirror 1132 on the workpiece W. The fθ lens 1133 is an optical system for irradiating the workpiece W with the measurement light ML #2-2 from the Galvano mirror 1132. The workpiece W is measured by the measurement light ML (specifically, the measurement light ML #2-2).

Here, not only the measurement light ML #2-2 but also the processing light EL enter the Galvano mirror 1132 as described above. Namely, the processing light EL and the measurement light ML #2-2 combined by the beam splitter 1131 enters the Galvano mirror 1132. Therefore, both of the processing light EL and the measurement light ML #2-2 pass through the same Galvano mirror 1132. Thus, the Galvano mirror 1132 may change the irradiation position of the processing light EL on the workpiece W and the irradiation position of the measurement light ML #2-2 on the workpiece W in synchronization with each other. Namely, the Galvano mirror 1132 may change the irradiation position of the processing light EL on the workpiece W and the irradiation position of the measurement light ML #2-2 on the workpiece W in conjunction with each other.

when the workpiece W is irradiated with the measurement light ML #2-2, a light due to the irradiation of the measurement light ML #2-2 is generated from the workpiece W. Namely, when the workpiece W is irradiated with the measurement light ML #2-2, the light due to the irradiation of the measurement light ML #2-2 is emitted from the workpiece W. The light due to the irradiation of the measurement light ML #2-2 (namely, the light emitted from the workpiece W due to the irradiation of the measurement light ML #2-2) may include at least one of the measurement light ML #2-2 reflected by the workpiece W (namely, the reflection light), a scattering light generated due to the irradiation of the measurement light ML #2-2 to the workpiece W, the measurement light ML #2-2 diffracted by the workpiece W (namely, a diffraction light) and the measurement light ML #2-2 passing through the workpiece W (namely, a transmitted light).

At least a part of the light emitted from the workpiece W due to the irradiation of the measurement light ML #2-2 (hereinafter, this light is referred to as a "measurement light ML #2-3) enters the emission optical system 113. The measurement light ML #2-3 entering the emission optical system 113 enters the beam splitter 1131 through the f lens 1133 and the Galvano mirror 1132. The beam splitter 1131 emits, toward the measurement optical system 112, the measurement light ML #2-3 entering the beam splitter 1131. In the example illustrated in FIG. 6, the measurement light ML #2-3 entering the beam splitter 1131 is reflected by the polarization split surface to be emitted toward the measurement optical system 112. Thus, in the example illustrated in FIG. 6, the measurement light ML #2-3 enters the polarization split surface of the beam splitter 1131 in a state where it has a polarized direction by which it is allowed to be reflected by the polarization split surface.

The measurement light ML #2-3 emitted from the beam splitter 1131 enters the mirror 1127 of the measurement optical system 112. The mirror 1127 reflects, toward the beam splitter 1124, the measurement light ML #2-3 entering the mirror 1127. The beam splitter 1124 emits, toward the beam splitter 1122, at least a part of the measurement light ML #2-3 entering the beam splitter 1124. The beam splitter 1122 emits, toward the detector 1126, the measurement light ML #2-3 entering the beam splitter 1122.

As described above, not only the measurement light ML #2-3 but also the measurement light ML #1-3 enter the detector 1126. Namely, the measurement light ML #2-3 that propagates toward the detector 1126 through the workpiece W and the measurement light ML #1-3 that propagates toward the detector 1126 without going through the workpiece W enter the detector 1126. Note that the measurement light ML #2-3 may be referred to as a reference light. The detector 1126 detects an interfering light generated by an interference between the measurement light ML #1-3 and the measurement light ML #2-3. Specifically, the detector 1126 detects the interfering light by optically receiving the interfering light. Thus, the detector 1126 may include a light reception element (a light reception part) that is configured to optically receive a light. Note that the detector 1126 may be referred to as a light reception member. A detected result by the detector 1126 is outputted to the control apparatus 4.

The control apparatus 4 calculates the state of the workpiece W based on a detected result by the detector 1123 and a detected result by the detector 1126. Here, with reference to FIG. 7, a principle for calculating the state of the workpiece W based on the detected result by the detector 1123 and the detected result by the detector 1126 will be described.

Figure 7:
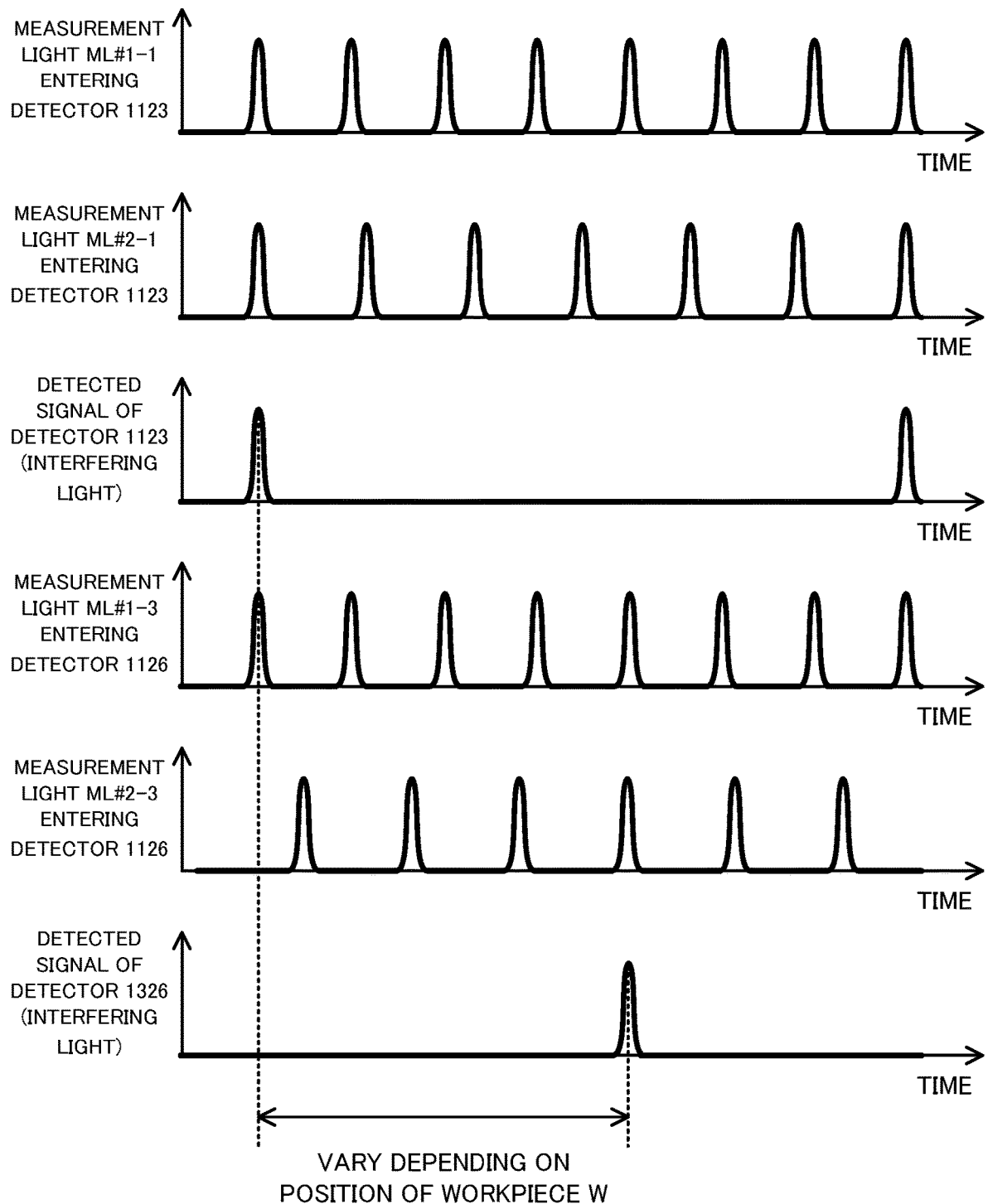
FIG. 7 is a timing chart that illustrates the measurement light entering a detector and an interfering light detected by the detector.

FIG. 7 is a timing chart that illustrates the measurement light ML #1-1 entering the detector 1123, the measurement light ML #2-1 entering the detector 1123, the interfering light detected by the detector 1123, the measurement light ML #1-3 entering the detector 1126, the measurement light ML #2-3 entering the detector 1126 and the interfering light detected by the detector 1126. Since the pulse frequency of the measurement light ML #1 is different from the pulse frequency of the measurement light ML #2, a pulse frequency of the measurement light ML #1-1 is different from a pulse frequency of the measurement light ML #2-1. Therefore, the interfering light generated by the interference between the measurement light ML #1-1 and the measurement light ML #2-1 is an interfering light in which a pulsed light appears in synchronization with a timing at which the pulsed light of the measurement light ML #1-1 and the pulsed light of the measurement light ML #2-1 enter the detector 1123 at the same time. Similarly, a pulse frequency of the measurement light ML #1-3 is different from a pulse frequency of the measurement light ML #2-3. Therefore, the interfering light generated by the interference between the measurement light ML #1-3 and the measurement light ML #2-3 is an interfering light in which a pulsed light appears in synchronization with a timing at which the pulsed light of the measurement light ML #1-3 and the pulsed light of the measurement light ML #2-3 enter the detector 1126 at the same time.

Here, a position (a position along a time axis) of the pulsed light of the interfering light detected by the detector 1126 changes depending on the positional relationship between the processing head 11 and the workpiece W. This is because the interfering light detected by the detector 1126 is the interfering light generated by the interference between the measurement light ML #2-3 that propagates toward the detector 1126 through the workpiece W and the measurement light ML #1-3 that propagates toward the detector 1126 without going through the workpiece W. On the other hand, a position (a position along a time axis) of the pulsed light of the interfering light detected by the detector 1123 does not change depending on the positional relationship between the processing head 11 and the workpiece W. Therefore, it can be said that a difference in time between the pulsed light of the interfering light detected by the detector 1123 and the pulsed light of the interfering light detected by the detector 1126 indirectly indicates the positional relationship between the processing head 11 and the workpiece W (typically, a distance between the processing head 11 and the workpiece W). Thus, the control apparatus 4 may calculate the state of the workpiece W based on the difference in time between the pulsed light of the interfering light detected by the detector 1123 and the pulsed light of the interfering light detected by the detector 1126. Specifically, the control apparatus 4 may 10) calculate a position of the workpiece W that is irradiated with the measurement light ML #2-2 based on the difference in time between the pulsed light of the interfering light detected by the detector 1126 and the pulsed light of the interfering light detected by the detector 1123. Namely, the control apparatus 4 may obtain an information related to the position of the workpiece W that is irradiated with the measurement light ML #2-2. Furthermore, when a plurality of parts of the workpiece W are irradiated with the measurement light ML #2-2 and/or the surface of the workpiece W is swept by the measurement light ML #2-2, the control apparatus 4 may calculate the shape of the workpiece W.

The calculated state of the workpiece W may be used to control the processing system SYS. Specifically, the calculated state of the workpiece W may be used to control the processing apparatus 1. The calculated state of the workpiece W may be used to control the processing head 11. The calculated state of the workpiece W may be used to control the head driving system 12. The calculated state of the workpiece W may be used to control the stage apparatus 3. The calculated state of the workpiece W may be used to control the stage driving system 33.

For example, the control apparatus 4 may change the relative positional relationship between the workpiece W and the processing head 11 based on the calculated state of the workpiece W so that the relative positional relationship between the workpiece W and the processing head 11 becomes a desired positional relationship. Namely, the control apparatus 4 may control, based on the calculated state of the workpiece W, an apparatus that is configured to change the relative positional relationship between the workpiece W and the processing head 11 so that the relative positional relationship between the workpiece W and the processing head 11 becomes the desired positional relationship. At least one of the head driving system 12 and the stage driving system 33 is one example of the apparatus that is configured to change the relative positional relationship between the workpiece W and the processing head 11. Note that a positional relationship that allows a desired position on the workpiece W to be irradiated with the processing light EL and/or the measurement light ML is one example of the "desired positional relationship".

For example, the control apparatus 4 may change the irradiation position of the processing light EL based on the calculated state of the workpiece W so that a desired position on the workpiece W is irradiated with the processing light EL. The angle adjustment optical element 1112 of the processing optical system 111, the Galvano mirror 1132 of the emission optical system 113, the head driving system 12 and the stage driving system 33 are examples of the apparatus that is configured to change the irradiation position of the processing light EL.

For example, the control apparatus 4 may change the irradiation position of the measurement light ML based on the calculated state of the workpiece W so that a desired position on the workpiece W is irradiated with the measurement light ML. The angle adjustment optical element 1112 of the processing optical system 111, the Galvano mirror 1132 of the emission optical system 113, the head driving system 12 and the stage driving system 33 are examples of the apparatus that is configured to change the irradiation position of the measurement light ML.

(3) Riblet Structure RB

Figure 8A:
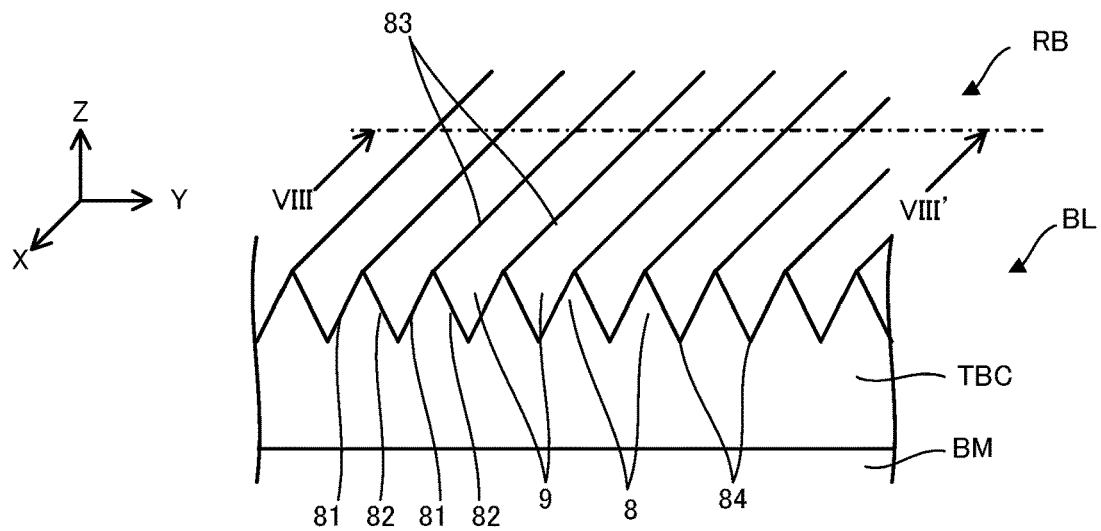
FIG. 8A is a perspective view that illustrates a riblet structure.
Figure 8B:
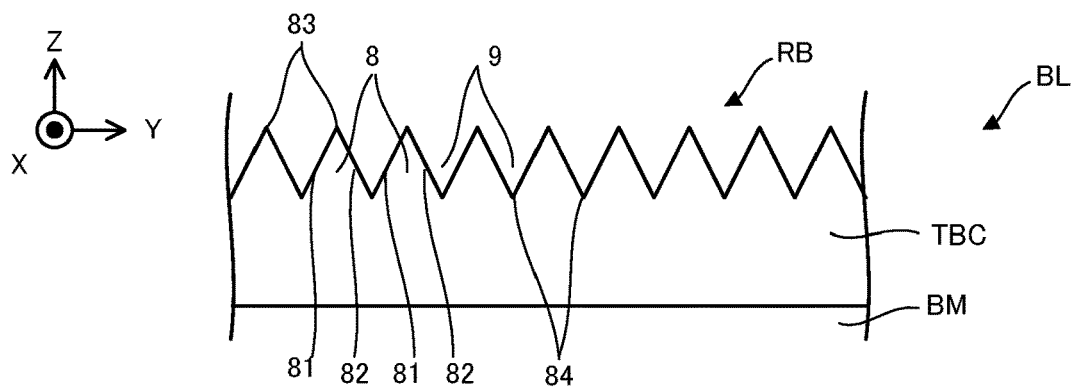
FIG. 8B is a cross-sectional view that illustrates the riblet structure (a VIII-VIII' cross-sectional view in FIG. 8A)
Figure 8C:
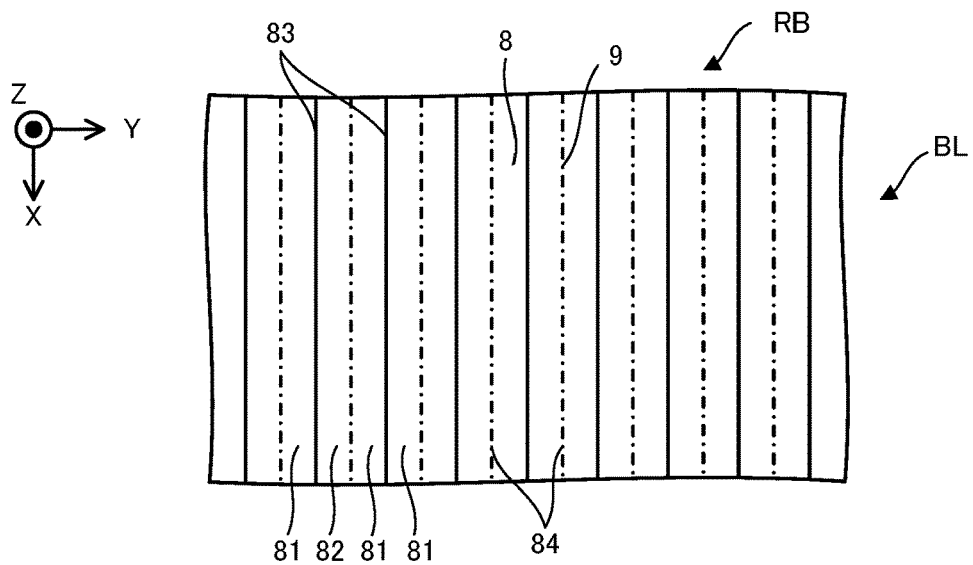
FIG. 8C is a top view that illustrates the riblet structure.

Next, with reference to FIG. 8A to FIG. 8B, the riblet structure RB formed on the workpiece W by the processing system SYS will be described. FIG. 8A is a perspective view that illustrates the riblet structure RB, FIG. 8B is a cross-sectional view that illustrates the riblet structure RB (a VIII-VIII' cross-sectional view in FIG. 8A), and FIG. 8C is a top view that illustrates the riblet structure RB. Especially, in the below described description, the riblet structure RB formed on the turbine blade BL that is one specific example of the workpiece W will be described. However, the riblet structure formed on the workpiece W that is different from the turbine blade BL may has same structure.

As illustrated in FIG. 8A to FIG. 8c, the riblet structure RB may include a structure in which a plurality of convex structures 8 each of which extends along a first direction that is along the surface of the turbine blade BL (namely, the surface of at least one of the base member BM and the heat resistant layer TBC), are arranged along a second direction that is along the surface of the turbine blade BL and that intersects with the first direction. In an example illustrated in FIG. 8A to FIG. 8C, the riblet structure RB includes a structure in which the plurality of convex structures 8 each of which extends along the X axis direction are arranged along the Y axis direction.

The convex structure 8 is a structure that protrudes along a direction that intersects with both of the direction along which the convex structure 8 extends and the direction along which the convex structures are arranged. In the example illustrated in FIG. 8A to FIG. 8C, the 10) convex structure 8 is a structure that protrudes along the Z axis direction.

A groove 9 that is concave relative to a circumference is formed between adjacent convex structures 8. Thus, the riblet structure RB may include a structure in which a plurality of grooves 9 each of which extends along the first direction that is along the surface of the turbine blade BL, are arranged along the second direction that is along the surface of the turbine blade BL and that intersects with the first direction.

Figure 9A:
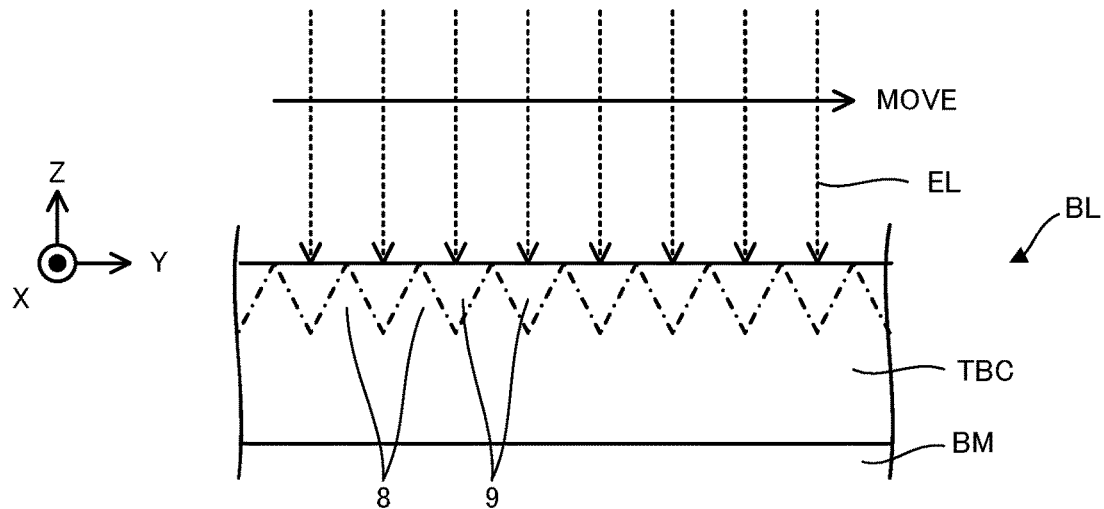
FIG. 9A is a cross-sectional view that illustrates a processing light EL with which the turbine blade is irradiated to form the riblet structure and FIG. 9B is a planar view that illustrate a moving trajectory of an irradiation position of the processing light on the surface of the turbine blade.
Figure 9B:
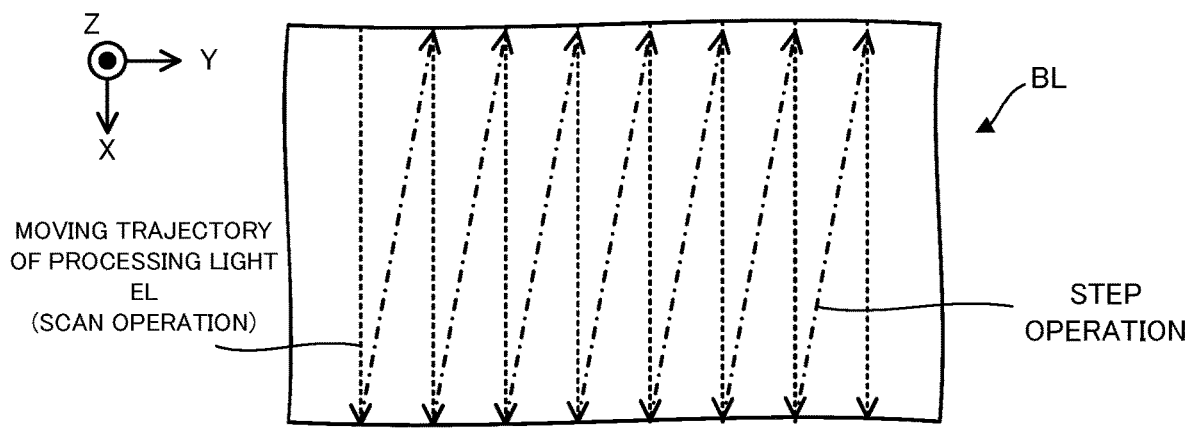

As described above, the processing system SYS in the present example embodiment forms the riblet structure RB by performing the removal processing. Thus, the processing system SYS may form the riblet structure RB by performing the removal processing for removing a part of the turbine blade BL on which the groove 9 is formed. Namely, the processing system SYS may form the riblet structure RB by performing the removal processing for removing a part of the turbine blade BL so that a part of the turbine blade BL on which the convex structure 8 is formed remains. For example, as illustrated in FIG. 9A that is a cross-sectional view illustrating the processing light EL with which the turbine blade BL is irradiated to form the riblet structure RB and FIG. 9B that is a planar view illustrating a moving trajectory of the irradiation position of the processing light EL on the surface of the turbine blade BL, the processing system SYS may irradiate the turbine blade BL with the processing light EL so that a part of the surface of the turbine blade BL on which the groove 9 is formed is irradiated with the processing light EL. Specifically, the processing system SYS may form the riblet structure RB by repeating: a scan operation for irradiating the surface of the turbine blade BL with the processing light EL while moving the irradiation position of the processing light EL along the X axis direction along which the groove 9 extends; and a step operation for moving the irradiation position of the processing light EL along the Y axis direction that intersects with the X axis direction along which the groove 9 extends without irradiating the surface of the turbine blade BL with the processing light EL. In this case, it can be said that the processing system SYS forms the riblet structure RB (in other words, forms the convex structures 8) by forming the grooves 9.

Again in FIG. 8A to FIG. 8C, the convex structure 8 includes a pair of side surfaces 81 and 82 facing toward directions that are opposite to each other, for example. In the example illustrated in FIG. 8A to FIG. 8C, the convex structure 8 includes the side surface 81 facing toward the −Y side and the side surface 82 facing toward the +Y side. Each of the pair of side surfaces 81 and 82 is a planar surface. However, at least one of the pair of side surfaces 81 and 82 may include a curved surface.

The pair of the side surfaces 81 and 82 may not be parallel to each other. In this case, the pair of the side surfaces 81 and 82 of the convex structure 8 may be connected to each other through one end parts (upper end parts at the +Z side in the example illustrated in FIG. 8A to FIG. 8C) thereof. A part at which the pair of the side surfaces 81 and 82 of the convex structure 8 are connected to each other forms a top part 83 of the convex structure 8. In this case, the pair of the side surfaces 81 and 82 of the convex structure 8 may be regarded to be connected to each other through the top part 83 of the convex structure 8. In the example illustrated in FIG. 8A to FIG. 8C, the pair of the side surfaces 81 and 82 are connected so that the upper end part of the side surface 81 contacts with the upper end part of the side surface 82. In this case, a shape of a cross-section of the convex structure 8 including the Z axis is a triangle shape. However, the shape of the cross-section of the convex structure 8 including the Z axis may be any shape that is different from the triangle shape. Moreover, the pair of the side surfaces 81 and 82 may be parallel to each other through another end parts (lower end parts at the −Z side in the example illustrated in FIG. 8A to FIG. 8C) thereof.

The side surface 81 of one convex structure 8 may be connected to the side surface 82 of another convex structure 8, which is adjacent to the one convex structure 8 along the direction along which the convex structures 8 are arranged. A part at which side surface 81 of one convex structure 8 is connected to the side surface 82 of another convex structure 8 forms a boundary part 84 between one convex structure 8 and another convex structure 8. In other words, the boundary part 84 corresponding to a concave area that is concave relative to a circumference exists between adjacent two convex structures 8. In this case, adjacent two convex structures 8 may be regarded to be connected to each other through the boundary part 84 In the example illustrated in FIG. 8A to FIG. 8C, adjacent two convex structures 8 are connected so that the lower end part of the side surface 81 of one convex structure 8 contacts with the lower end part of the side surface 82 of another convex structure 8. In this case, a shape of a cross-section of the groove 9 including the Z axis is an inverted triangle shape. However, the shape of the cross-section of the groove 9 including the Z axis may be any shape that is different from the inverted triangle shape.

When the turbine blade BL includes the base member BM and the heat resistant layer TBC, the processing system SYS may form the riblet structure RB on the heat resistant layer TBC as illustrated in FIG. 8A to FIG. 8C. Specifically, the processing system SYS may form the riblet structure RB on the surface (the upper surface facing toward the +Z side in the example illustrated in FIG. 8A to FIG. 8C) of the heat resistant layer TBC that faces toward a side opposite to a side toward the base member BM. The processing system SYS may form the riblet structure RB on the surface of the heat resistant layer TBC opposite to a surface thereof facing toward the base member BM. The processing system SYS may form the riblet structure RB on the surface of the heat resistant layer TBC that contacts with the fluid when the turbine blade BL is used. In this case, the processing system SYS is capable of forming the riblet structure RB gain relative easily, because the processing system SYS does not directly process the base member BM. Specifically, when the riblet structure RB is formed again, the heat resistant layer TBC on which the riblet structure RB is formed is removed first, and then new heat resistant layer TBC is formed. Then, the processing system SYS may form the riblet structure RB on the newly formed heat resistant layer TBC. Therefore, a deterioration (for example, a destruction and the like) of the riblet structure RB may be handled relatively easily by forming the riblet structure RB again. Furthermore, the processing system SYS is capable of forming the riblet structure RB on the surface of the base member BM which is difficult to be processed or on which the riblet structure RB is not formed, because the base member BM is not directly processed. Namely, the processing system SYS is capable of forming the riblet structure RB relatively easily by processing the heat resistant layer TBC after the heat resistant layer TBC is formed on the surface of the base member BM.

Figure 10:
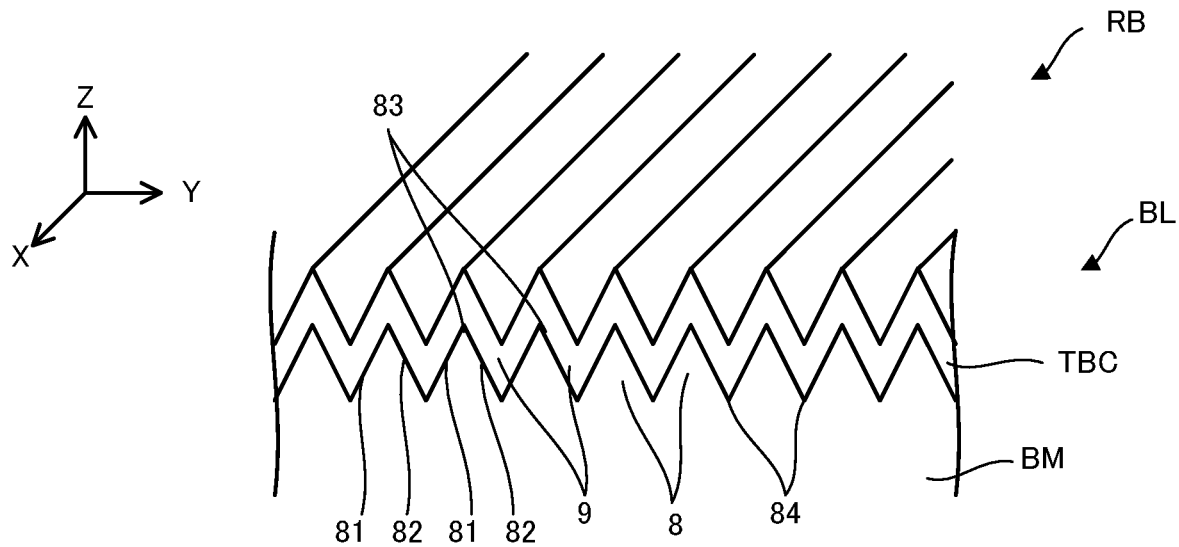
FIG. 10 is a perspective view that illustrates the riblet structure.

Alternatively, when the turbine blade BL includes the base member BM and the heat resistant layer TBC, the processing system SYS may form the riblet structure RB on the base member BM as illustrated in FIG. 10 that is a perspective view illustrating the riblet structure RB. Specifically, the processing system SYS may form the riblet structure RB on the surface (the upper surface facing toward the +Z side in the example illustrated in a drawing) of the base member BM facing the heat resistant layer TBC. In this case, as illustrated in FIG. 10, the heat resistant layer TBC may be formed on the surface (especially, the surface on which the riblet structure RB is formed) of the base member BM after the riblet structure RB is formed on the base member BM. The heat resistant layer TBC covers with the surface of the base member BM, and thus, a shape of the surface of the heat resistant layer TBC may be substantially same as a shape of the surface of the base member BM on which the heat resistant layer TBC is formed. Thus, the turbine blade BL in which the heat resistant layer TBC is formed on the base member BM on which the riblet structure RB is formed may be regarded to be equivalent to the turbine blade BL in which the riblet structure RB is formed on the heat resistant layer TBC.

Figure 11:
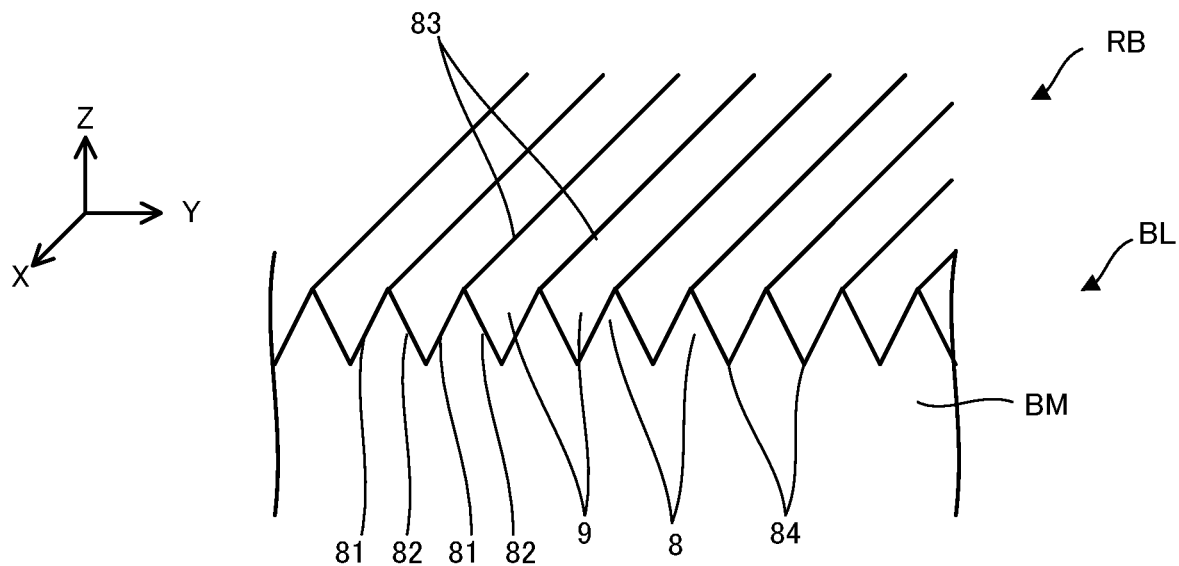
FIG. 11 is a perspective view that illustrates the riblet structure.

Alternative, even when the turbine blade BL includes the base member BM but does not include the heat resistant layer TBC, the processing system SYS may form the riblet structure RB on the base member BM as illustrated in FIG. 11 that is a perspective view illustrating the riblet structure RB. Namely, the heat resistant layer TBC may not be necessarily formed on the base member BM on which the riblet structure RB is formed.

(4) Modified Example of Operation for Constituting Riblet Structure RB

Next, a modified example of an operation for constituting the riblet structure RB will be described.

(4-1) First Modified Example of Operation for constituting Riblet Structure RB

In a first modified example, the processing system SYS may form the riblet structure RB in which a shape of at least one of the top part 83 of the convex structure 8 and the boundary part 84 of the convex structure 8 is different from the shape illustrated in the above described FIG. 8A to FIG. 8C and FIG. 10 to FIG. 11. Next, with reference to FIG. 12 to FIG. 18, the riblet structure RB formed in the first modified example will be described. Each of FIG. 12 to FIG. 18 is a cross-sectional view that illustrates one example of the riblet structure RB formed in the first modified example.

Figure 12:
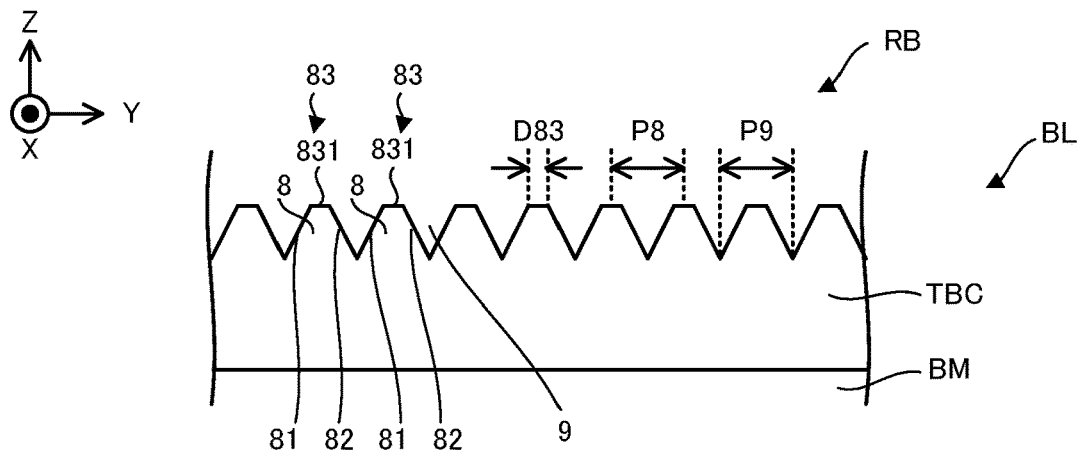
FIG. 12 is a cross-sectional view that illustrates one example of the riblet structure formed in a first modified example.

As illustrated in FIG. 12, the processing system SYS may form the riblet structure RB so that the top part 83 of the convex structure 8 includes a planar surface 831. The planar surface 831 connects the one end parts (upper end parts at the +Z side in an example illustrated in FIG. 12) of the pair of the side surfaces 81 and 82 of the convex structure 8. Namely, the pair of the side surfaces 81 and 82 are connected through the planar surface 831 included in the top part 83. Thus, in the example illustrated in FIG. 12, the upper end part of the side surface 81 and the upper end part of the side surface 82 do not directly contact with each other. The planar surface 831 intersects with each of the pair of the side surfaces 81 and 82. The planar surface 831 is a surface that faces toward a side (the +Z side and an upward side in the example illustrated in FIG. 12) opposite to a side toward the base member BM. Thus, the planar surface 831 may be referred to as an upper surface.

Figure 13:
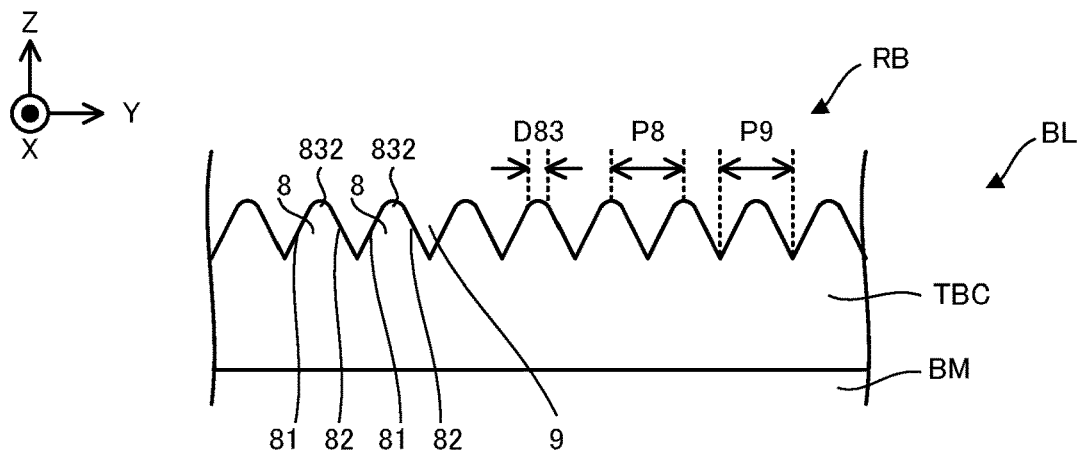
FIG. 13 is a cross-sectional view that illustrates one example of the riblet structure formed in the first modified example.

As illustrated in FIG. 13, the processing system SYS may form the riblet structure RB so that the top part 83 of the convex structure 8 includes a curved surface 832. The curved surface 832 connects the one end parts (the upper end parts at the +Z side in an example illustrated in FIG. 13) of the pair of the side surfaces 81 and 82 of the convex structure 8. Namely, the pair of the side surfaces 81 and 82 are connected through the curved surface 832 included in the top part 83. Thus, in the example illustrated in FIG. 13, the upper end part of the side surface 81 and the upper end part of the side surface 82 do not directly contact with each other. The curved surface 832 intersects with each of the pair of the side surfaces 81 and 82. The curved surface 832 is a surface that faces toward a side (the +Z side and an upward side in the example illustrated in FIG. 13) opposite to a side toward the base member BM. Thus, the curved surface 832 may be referred to as an upper surface. The curved surface 832 may be a curved surface that is convex toward the side opposite to the side toward the base member BM.

Figure 14:
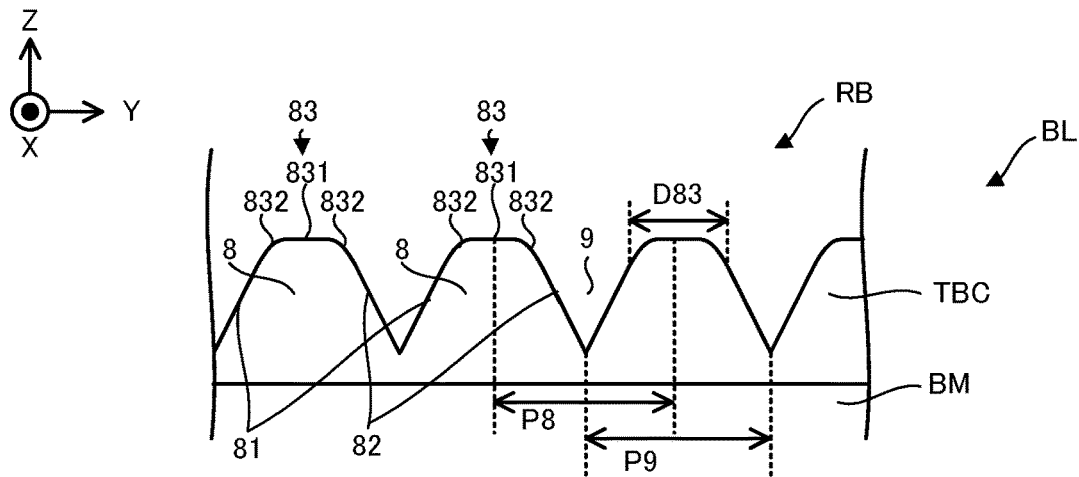
FIG. 14 is a cross-sectional view that illustrates one example of the riblet structure formed in the first modified example.

As illustrated in FIG. 14, the processing system SYS may form the riblet structure RB so that the top part 83 of the convex structure 8 includes both of the planar surface 831 and the curved surface 832. For example, the top part 83 may include the planar surface 831 and a pair of curved surfaces 832 between which the planar surface 831 is located. One end parts of the pair of the curved surfaces 832 are connected to one end parts (for example, the upper end parts) of the pair of the side surfaces 81 and 82 of the convex structure 8, respectively. Furthermore, the planar surface 831 connects the other end parts of the pair of the curved surfaces 832. Namely, one of the pair of the curved surfaces 832 connects the planar surface 831 and the side surface 81 and the other one of the pair of the curved surfaces 832 connects the planar surface 831 and the side surface 82. In this case, the pair of side surfaces 81 and 82 are connected through the planar surface 831 and the curved surface 832 included in the top part 83. Thus, in an example illustrated in FIG. 14, the upper end part of the side surface 81 and the upper end part and of the side surface 82 do not directly contact with each other.

In an example illustrated in FIG. 12 to FIG. 14, a size D83 of the top part 83 may be set based on a pitch P8 of the convex structure 8. For example, the size D83 of the top part 83 may be set to be in a range of at least 1% to 9% (namely, several percentages) of the pitch P8 of the convex structure 8. For example, the size D83 of the top part 83 may be set to be in a range of at least 1% to 6% of the pitch P8 of the convex structure 8. For example, the size D83 of the top part 83 may be set to be in a range of at least 1% to 3% of the pitch P8 of the convex structure 8. Note that "the size D83 of the top part 83" in the present example embodiment may mean a size (typically, a width) of a surface forming the top part 83 in a direction along which the convex structures 8 are arranged. In the example illustrated in FIG. 12, the size D83 of the top part 83 may mean a size of the planar surface 831 included in the top part 83 in the Y axis direction. In the example illustrated in FIG. 13, the size D83 of the top part 83 may mean a size of the curved surface 832 included in the top part 83 in the Y axis direction. In the example illustrated in FIG. 14, the size D83 of the top part 83 may mean a total sum of sizes of the planar surface 831 and the pair of curved surfaces 832 included in the top part 83 in the Y axis direction. Moreover, "the pitch P8 of the convex structure 8" in the present example embodiment may mean an interval between adjacent two convex structures 8 along a direction (a pitch direction) intersecting with a direction along which the convex structure 8 extends. In the example illustrated in FIG. 12, the pitch P8 of the convex structure 8 may mean an interval between adjacent two convex structures 8 along the Y axis direction. "The pitch P8 of the convex structure 8" may be regarded to be substantially equivalent to "a pitch P9 of the groove 9", because the convex structure 8 and the groove 9 are formed alternately along the direction intersecting with the direction along which the convex structure 8 extends. Note that "the pitch P9 of the groove 9" in the present example embodiment may mean an interval between adjacent two grooves 9 along a direction (a pitch direction) intersecting with a direction along which the groove 9 extends. In the example illustrated in FIG. 12, the pitch P9 of the groove 9 may mean an interval between adjacent two grooves 9 along the Y axis direction.

In the example illustrated in FIG. 13 to FIG. 14, a radius of curvature of the curved surface 832 may be set to be in a range from 1 micro-meter to 9 micro-meter (namely, several micro-meter). The radius of curvature of the curved surface 832 may be set to be in a range from 1 micro-meter to 6 micro-meter. The radius of curvature of the curved surface 832 may be set to be in a range from 1 micro-meter to 4 micro-meter. The radius of curvature of the curved surface 832 may be set to be in a range from 1 micro-meter to 2 micro-meter.

When the top part 83 includes at least one of the planar surface 831 and the curved surface 832, an angle of a corner formed by the top part 83 is larger (namely, is gentler), compared to a case where the top part 83 does not include the planar surface 831 and the curved surface 832 (as a result, the upper end part of the side surface 81 is directly connected to the upper end part of the side surface 82). As a result, there is a lower possibility that the top part 83 cracks. Therefore, the processing system SYS is capable of forming the riblet structure RB having a relatively high durability. Especially, the top part 83 including the curved surface 832 may be regarded to be substantially equivalent to the top part 83 on which a chamfering is performed. As a result, when the top part 83 includes the curved surface 832, there is a lower possibility that the top part 83 cracks, compared to a case where the top part 83 includes the planar surface 831. Therefore, the processing system SYS is capable of forming the riblet structure RB having a relatively higher durability.

Figure 15:
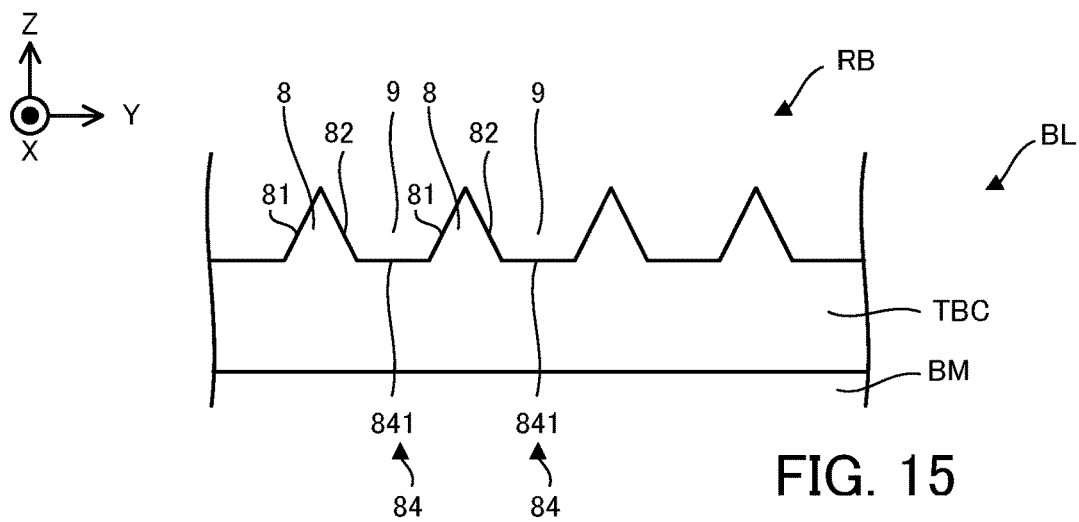
FIG. 15 is a cross-sectional view that illustrates one example of the riblet structure formed in the first modified example.

As illustrated in FIG. 15, the processing system SYS may form the riblet structure RB so that the boundary part 84 of the convex structure 8 includes a planar surface 841. The planar surface 841 connects adjacent two convex structures 8. Namely, the adjacent two convex structures 8 are connected through the planar surface 841 forming the boundary surface 84. Specifically, the planar surface 841 connects the lower end part of the side surface 81 of one convex structure 8 and the lower end part of the side surface 82 of another convex structure 8 that is adjacent to the one convex structure 8. Thus, in the example illustrated in FIG. 15, the lower end part of the side surface 81 of one convex structure 8 and the lower end part of the side surface 82 of another convex structure 8 do not directly contact with each other. The planar surface 841 intersects with each of the pair of the side surfaces 81 and 82. The planar surface 841 is a surface that faces toward a side (the +Z side and an upward side in the example illustrated in FIG. 12) opposite to a side toward the base member BM. Thus, the planar surface 841 may be referred to as an upper surface.

Figure 16:
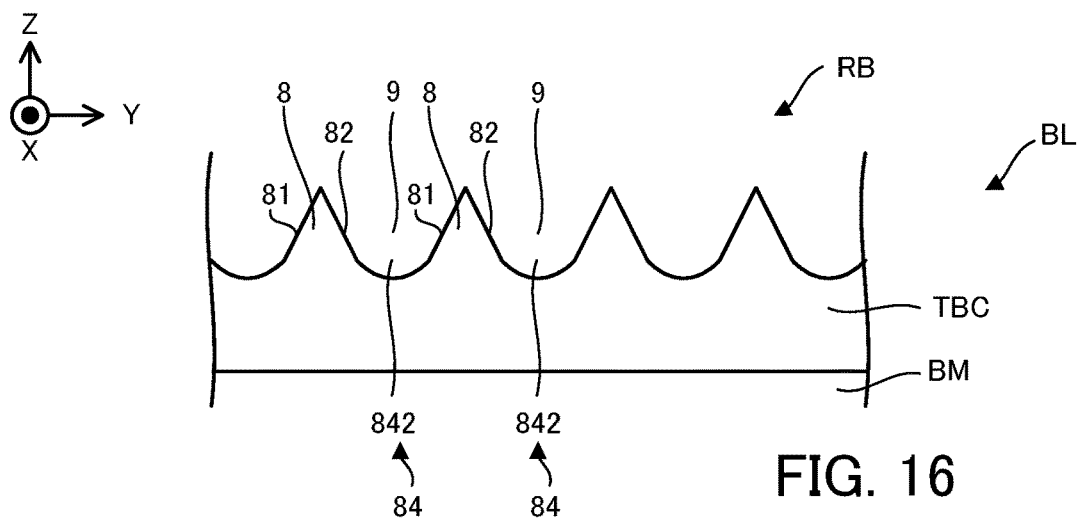
FIG. 16 is a cross-sectional view that illustrates one example of the riblet structure formed in the first modified example.

As illustrated in FIG. 16, the processing system SYS may form the riblet structure RB so that the boundary part 84 of the convex structure 8 includes a curved surface 842. The curved surface 842 connects adjacent two convex structures 8. Namely, the adjacent two convex structures 8 are connected through the curved surface 842 forming the boundary surface 84. Specifically, the curved surface 842 connects the lower end part of the side surface 81 of one convex structure 8 and the lower end part of the side surface 82 of another convex structure 8 that is adjacent to the one convex structure 8. Thus, in the example illustrated in FIG. 16, the lower end part of the side surface 81 of one convex structure 8 and the lower end part of the side surface 82 of another convex structure 8 do not directly contact with each other. The curved surface 842 intersects with each of the pair of the side surfaces 81 and 82. The curved surface 842 is a surface that faces toward a side (the +Z side and an upward side in the example illustrated in FIG. 12) opposite to a side toward the base member BM. Thus, the curved surface 842 may be referred to as an upper surface. The curved surface 842 may be a curved surface that is convex toward the base member BM.

Figure 17:
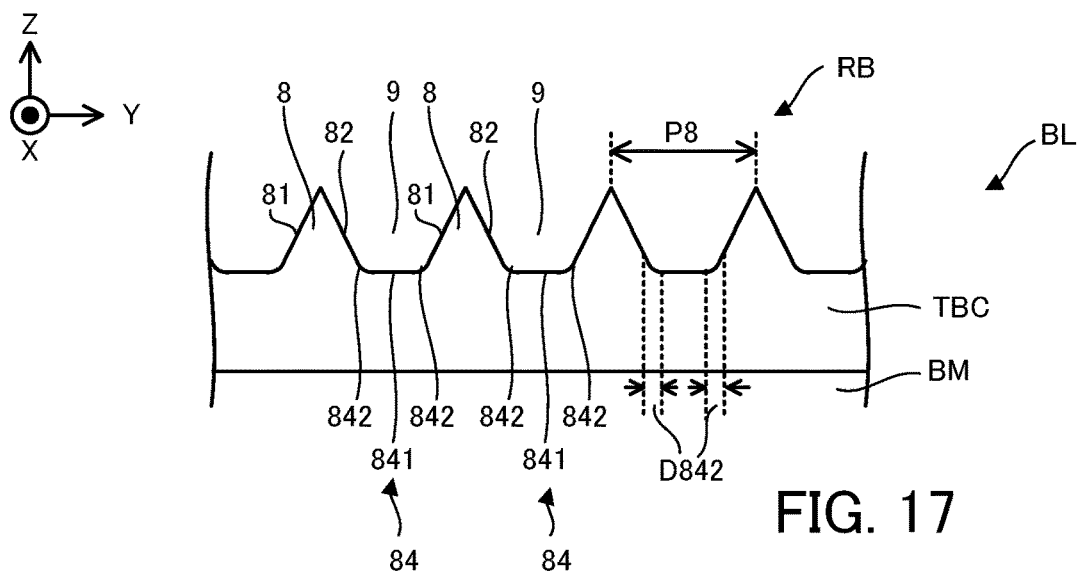
FIG. 17 is a cross-sectional view that illustrates one example of the riblet structure formed in the first modified example.

As illustrated in FIG. 17, the processing system SYS may form the riblet structure RB so that the boundary part 84 of the convex structure 8 includes both of the planar surface 841 and the curved surface 842. For example, the boundary part 84 may include the planar surface 841 and a pair of curved surfaces 842. One end part of one of the pair of the curved surfaces 842 is connected to another end part (for example, the lower end part) of the side surface 81 of one convex structure 8. One end part of the other one of the pair of the curved surfaces 842 is connected to another end part (for example, the lower end part) of the side surface 82 of another convex structure 8 that is adjacent to the one convex structure 8. Furthermore, the planar surface 841 connects the other end parts of the pair of the curved surfaces 842. Namely, one of the pair of the curved surfaces 832 connects the planar surface 841 and the side surface 81 of one convex structure 8 and the other one of the pair of the curved surfaces 832 connects the planar surface 841 and the side surface 82 of another convex structure 8. In this case, the adjacent two convex structures 8 are connected through the planar surface 841 and the curved surface 842 included in the boundary part 84. Thus, in an example illustrated in FIG. 17, the lower end part of the side surface 81 and the lower end part and of the side surface 82 do not directly contact with each other.

In an example illustrated in FIG. 17, a total sum of sizes D84s of the pair of the curved surfaces 842 (namely, 2×D842) may be set based on the pitch P8 of the convex structure 8. For example, the total sum of the sizes D842 of the pair of the curved surfaces 842 may be smaller than the pitch P8 of the convex structure 8. Note that "the size D842 of the curved surface 842" in the present example embodiment may mean a size (typically, a width) of the curved surface 842 in a direction along which the convex structures 8 are arranged. In the example illustrated in FIG. 17, the size D842 of the curved surface 842 may mean a size of the curved surface 842 in the Y axis direction. Moreover, in an example illustrated in FIG. 16 and FIG. 17, a radius of curvature of the curved surface 842 may be set to be in a range from 1 micro-meter to 9 micro-meter (namely, several micro-meter). The radius of curvature of the curved surface 842 may be set to be in a range from 1 micro-meter to 6 micro-meter. The radius of curvature of the curved surface 842 may be set to be in a range from 1 micro-meter to 4 micro-meter. The radius of curvature of the curved surface 842 may be set to be in a range from 1 micro-meter to 2 micro-meter.

When the boundary part 84 includes at least one of the planar surface 841 and the curved surface 842, an angle of a corner formed by the boundary part 84 is larger, compared to a case where the boundary part 84 does not include the planar surface 841 and the curved surface 842 (as a result, the lower end part of the side surface 81 is directly connected to the lower end part of the side surface 82). As a result, there is a lower possibility that the boundary part 84 cracks. Therefore, the processing system SYS is capable of forming the riblet structure RB having a relatively high durability. Especially, the boundary part 84 including the curved surface 842 may be regarded to be substantially equivalent to the boundary part 84 on which a chamfering is performed. As a result, when the boundary part 84 includes the curved surface 842, there is a lower possibility that the boundary part 84 cracks, compared to a case where the boundary part 84 includes the planar surface 841. Therefore, the processing system SYS is capable of forming the riblet structure RB having a relatively higher durability.

Figure 18:
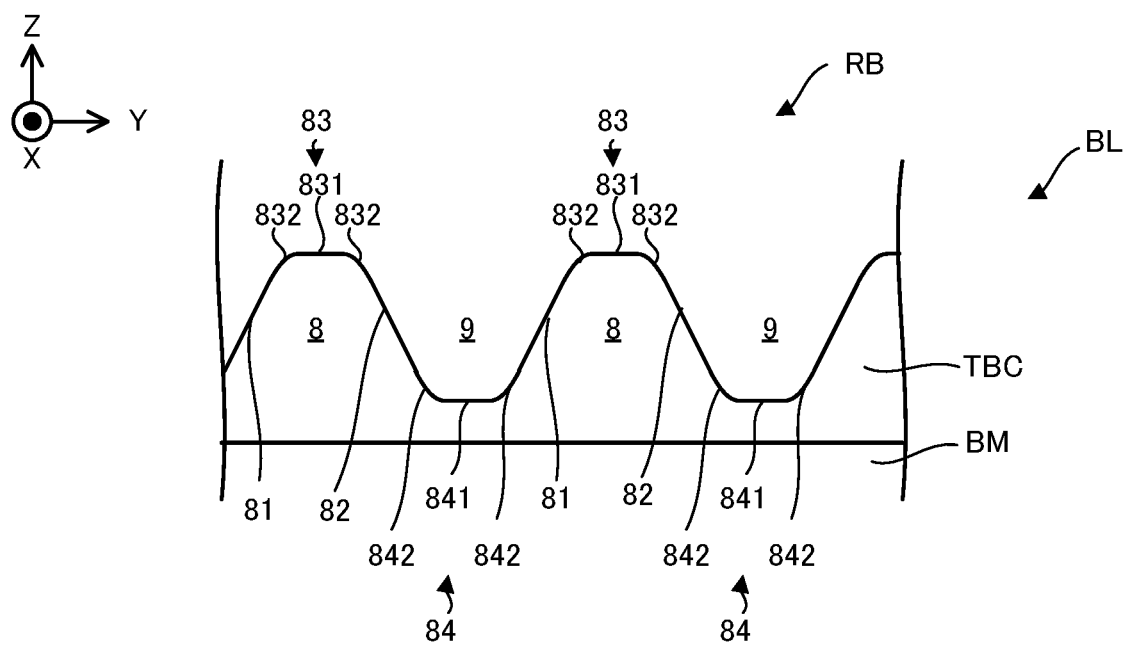
FIG. 18 is a cross-sectional view that illustrates one example of the riblet structure formed in the first modified example.

As illustrated in FIG. 18, the processing system SYS may form the riblet structure RB so that the top part 83 of the convex structure 8 includes at least one of the planar surface 831 and the curved surface 832 and the boundary part 84 of the convex structure 8 includes at least one of the planar surface 841 and the curved surface 842. FIG. 18 illustrates the riblet structure RB in which the top part 83 includes the planar surface 831 and the pair of curved surfaces 832 and the boundary part 84 includes the planar surface 841 and the pair of curved surfaces 842. Even in this case, the processing system SYS is capable of forming the riblet structure RB having a relatively higher durability.

Note that the above described FIG. 12 to FIG. 18 illustrate the example in which the processing system SYS forms the riblet structure RB on the heat resistant layer TBC. However, the processing system SYS may form the riblet structure RB having the shape illustrated in FIG. 12 to FIG. 18 on the base member BM. Even in this case, the processing system SYS is capable of forming the riblet structure RB having the relatively high durability.

Moreover, when the riblet structure RB having the shape illustrated in FIG. 12 to FIG. 18 is formed on the base member BM, the angle of the corner formed at at least one of the top part 83 and the boundary part 84 of the convex structure 8 included in the riblet structure RB is larger. As a result, an adherence of the heat resistant layer TBC to the corner improves, compared to a case where the angle of the corner formed at at least one of the top part 83 and the boundary part 84 is relatively small (namely, relatively steep).

Moreover, when the angle of the corner formed at at least one of the top part 83 and the boundary part 84 is large, it is also possible to achieve such an effect that there is a high possibility that a surface treatment is properly performed on the surface of the base member BM on which the riblet structure RB is formed, compared to the case where the angle of the corner formed at at least one of the top part 83 and the boundary part 84 is relatively small. For example, it is also possible to achieve such an effect that there is a high possibility that a quenching that is one example of the surface treatment is properly performed on the surface of the base member BM on which the riblet structure RB is formed. As a result, it is possible to achieve such an effect that there is a high possibility that any coat layer is properly formed on the base member BM on which the riblet structure RB is formed, when any coat layer is formed on the base member BM on which the riblet structure RB is formed by performing the surface treatment such as the quenching on the surface of the base member BM as described later.

(4-2) Second Modified Example of Operation for constituting Riblet Structure RB

Figure 19A:
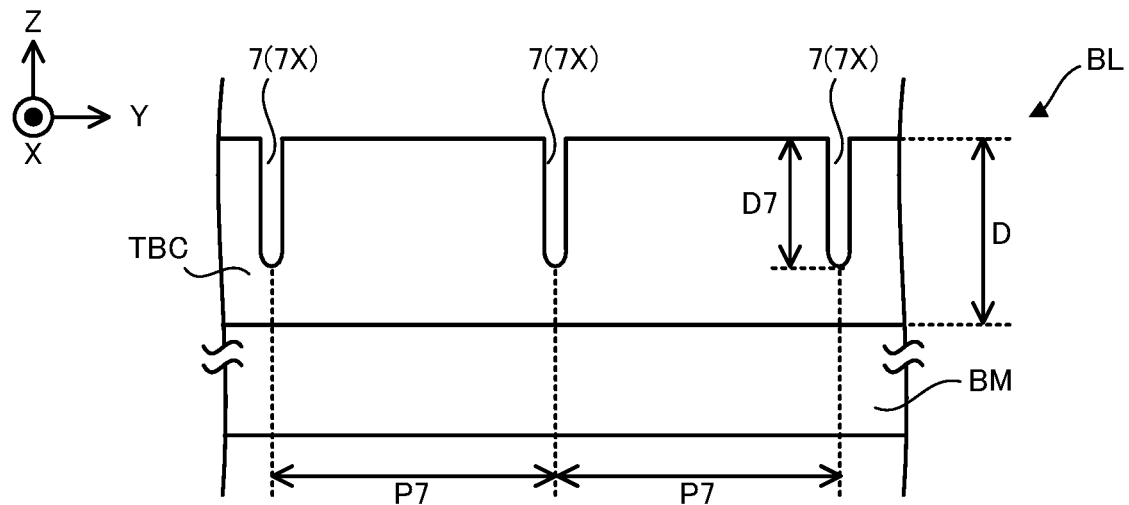
FIG. 19A is a cross-sectional view that illustrates the turbine blade on which a plurality of grooves are formed and FIG. 19B is a top view that illustrates the turbine blade on which the plurality of grooves are formed.

In the second modified example, the processing system SYS may form the riblet structure RB on the turbine blade BL on which a groove 7, which is different from the groove 9 for constituting the riblet structure RB, is formed. Here, with reference to FIG. 19A and FIG. 19B, the turbine blade BL on which the groove 7 is formed will be described. FIG. 19A is a cross-sectional view that illustrates the turbine blade BL on which the groove 7 is formed and FIG. 19B is a top view that illustrates the turbine blade BL on which the groove 7 is formed.

Figure 19B:
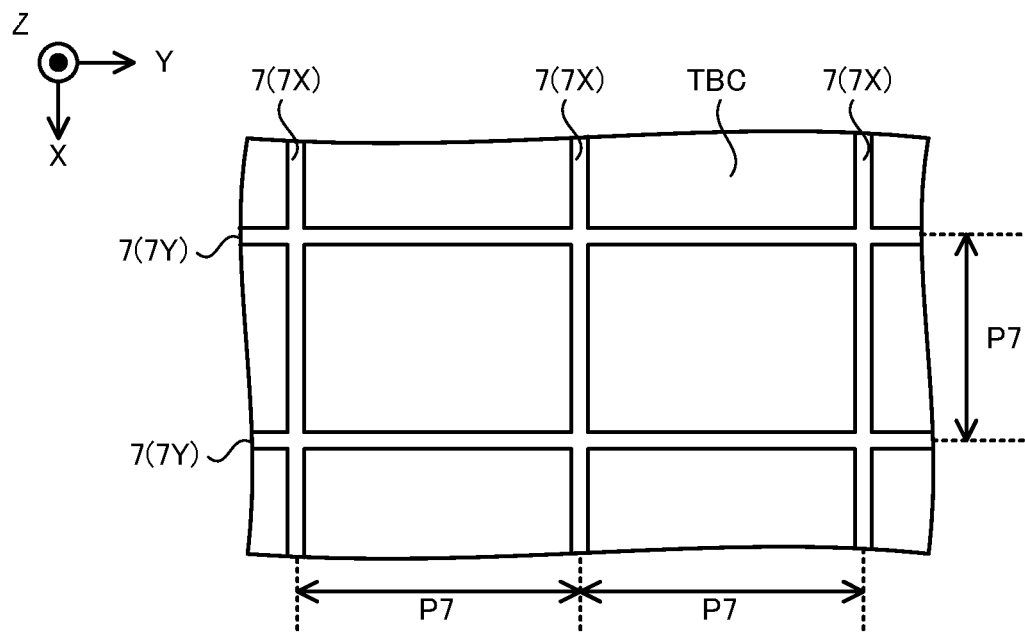

As illustrated in FIG. 19A and FIG. 19B, the groove 7, which extends along a direction that is along the surface of the turbine blade BL, may be formed on the turbine blade BL. For example, a single groove 7, which extends along a third direction that is along the surface of the turbine blade BL, may be formed on the turbine blade BL. For example, a plurality of grooves 7, each of which extends along the third direction that is along the surface of the turbine blade BL, may be formed on the turbine blade BL. The plurality of grooves 7 each of which extends along the third direction may be arranged along a fourth direction that intersect with the third direction. For example, a plurality of grooves 7, which respectively extend along a plurality of different directions that are along the surface of the turbine blade BL, may be formed on the turbine blade BL. For example, at least one groove 7 extending along the third direction that is along the surface of the turbine blade BL and at least one groove 7 extending along the fourth direction that is along the surface of the turbine blade BL and that intersects with the third direction may be formed on the turbine blade BL. In an example illustrated in FIG. 19A and FIG. 19B, a plurality of grooves 7 each of which extends along the X axis direction and which are arranged along the Y axis direction (hereinafter, the groove 7 extending along the X axis direction is referred to as a "groove 7X") and a plurality of grooves 7 each of which extends along the Y axis direction and which are arranged along the X axis direction (hereinafter, the groove 7 extending along the Y axis direction is referred to as a "groove 7Y") are formed.

A depth D7 (a size along the Z axis direction in the example illustrated in FIG. 19A) of the groove 7 may be set based on a thickness D (a size along the Z axis direction in the example illustrated in FIG. 19A) of the heat resistant layer TBC on which the groove 7 is formed. For example, the depth D7 of the groove 7 may be set to be smaller than the thickness D9 of the heat resistant layer TBC. The depth D7 of the groove 7 may be set to be equal to or smaller than 30% of the thickness D9 of the heat resistant layer TBC. For example, when the thickness D9 of the heat resistant layer TBC is 300 micro-meter to 1 milli-meter, the depth D7 of the groove 7 may be set to be equal to or smaller than 90 micro-meter (=300 micro-meter×30%) to 300 micro-meter (=1 milli-meter×30%).

When the plurality of grooves 7 are formed, the depths D7 of the plurality of grooves 7 may be equal to each other. Alternatively, the depths D7 of at least two of the plurality of grooves 7 may be different from each other. For example, the depth D7 of the groove 7 formed on a first part of the surface of the turbine blade BL may be different from the depth D7 of the groove 7 formed on a second part of the surface of the turbine blade BL. For example, the depth D7 of the groove 7 that extends along the third direction may be different from the depth D7 of the groove 7 that extends along the fourth direction intersecting with the third direction.

When the plurality of grooves 7 are formed, the plurality of grooves 7 may be formed to be arranged at a same pitch P7. Note that "the pitch P7 of the groove 7" in the present example embodiment may mean an interval between adjacent two grooves 7 along a direction (a pitch direction) intersecting with a direction along which the groove 7 extends. In the example illustrated in FIG. 19, the pitch P7 of the groove 7X may mean an interval between adjacent two grooves 7X along the Y axis direction. The pitch P7 of the groove 7Y may mean an interval between adjacent two grooves 7X along the X axis direction. Alternatively, the plurality of grooves 7 may be formed to be arranged at different pitches P7. For example, the pitch P7 of the groove 7 extending along the third direction may be different from the pitch P7 of the groove 7 extending along the fourth direction. For example, the pitch P7 of the groove 7 formed on a third part of the surface of the turbine blade BL may be different from the pitch P7 of the groove 7 formed on a fourth part of the surface of the turbine blade BL.

The groove 7 may be a groove by which a stress of the turbine blade BL is reducible. Namely, the groove 7 may have a function that reduces the stress of the turbine blade BL. Especially, since the groove 7 is formed on the heat resistant layer TBC, the groove 7 may be a groove by which a stress of the heat resistant layer TBC is reducible. For example, there is a possibility that the heat resistant layer TBC expands and contracts, when a temperature of the heat resistant layer TBC changes. Namely, there is a possibility that the heat resistant layer TBC expands and contracts. The groove 7 may be a groove that reduces the stress generated in the heat resistant layer TBC due to the expansion and contraction of the heat resistant layer TBC. For example, in this case, when the heat resistant layer TBC is deformed so that a width of the groove 7 is changed in response to the expansion and contraction of the heat resistant layer TBC, the stress generated in the heat resistant layer TBC due to the expansion and contraction of the heat resistant layer TBC is reduced. As a result, there is a relatively low possibility that the heat resistant layer TBC is destroyed due to the stress. Thus, it is possible to manufacture the turbine blade BL which has a relatively high durability relative to the stress and whose resistance to the fluid is properly reduced.

The groove 7 may be formed by a processing system that is different from the processing system SYS. For example, the groove 7 may be formed by another processing system that is configured to form the groove 7 by a laser cutting or a laser etching. The processing system SYS may form, under the control of the control apparatus 4, the above described riblet structure RB on the turbine blade BL on which the groove 7 is formed by another processing system. In this case, the processing system SYS may form the groove 7 based on an information related to the formed groove 7. For example, the processing system SYS may measure the formed groove 7 by using the measurement light ML, and form the groove 7 based on an information related to a measured result of the groove 7 by the measurement light ML. As one specific example, the processing system SYS may determine a position of the groove 7 on the surface of the turbine blade BL (for example, the surface of the heat resistant layer TBC) based on the information related to the measured result of the groove 7 by the measurement light ML, and form the riblet structure RB by irradiating, with the processing light EL, a position that has a predetermined positional relationship with the determined position of the groove 7. Namely, the information related to the measured result of the groove 7 may be used as an information for controlling the irradiation position of the processing light EL (what we call a servo information).

Alternatively, the groove 7 may be formed by the processing system SYS. Namely, the processing system SYS may form, under the control of the control apparatus 4, the groove 7 by the removal processing using the processing light EL in a same manner as a case where the groove 9 for constituting the riblet structure RB is formed. In this case, the processing system SYS may form the riblet structure RB after forming the groove 9 under the control of the control apparatus 4. Alternatively, the processing system SYS may form the groove 7 after forming the riblet structure RB under the control of the control apparatus 4.

Figure 20:
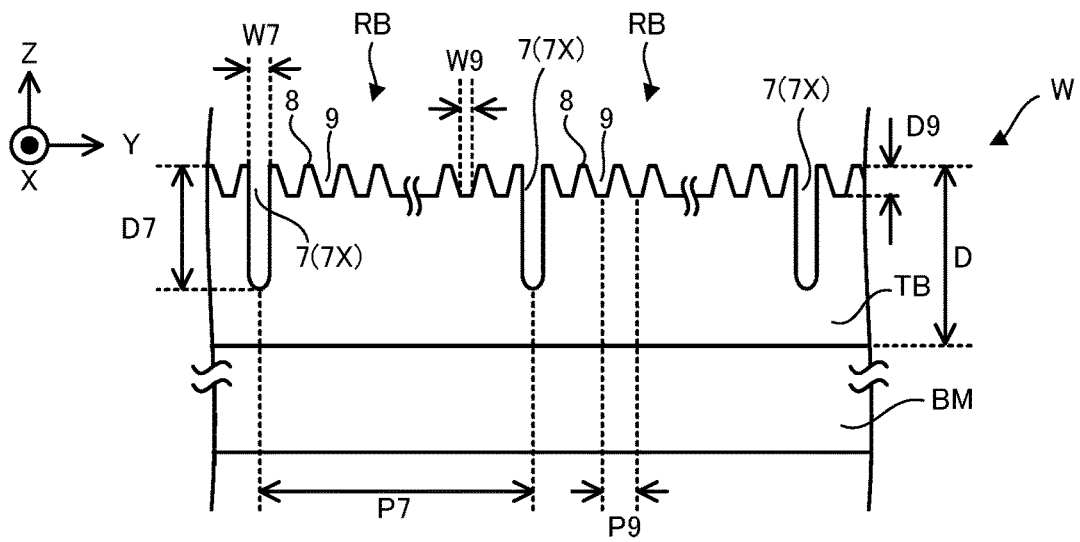
FIG. 20 is a cross-sectional view that illustrates the turbine blade on which both of the grooves and the riblet structure are formed.
Figure 21:
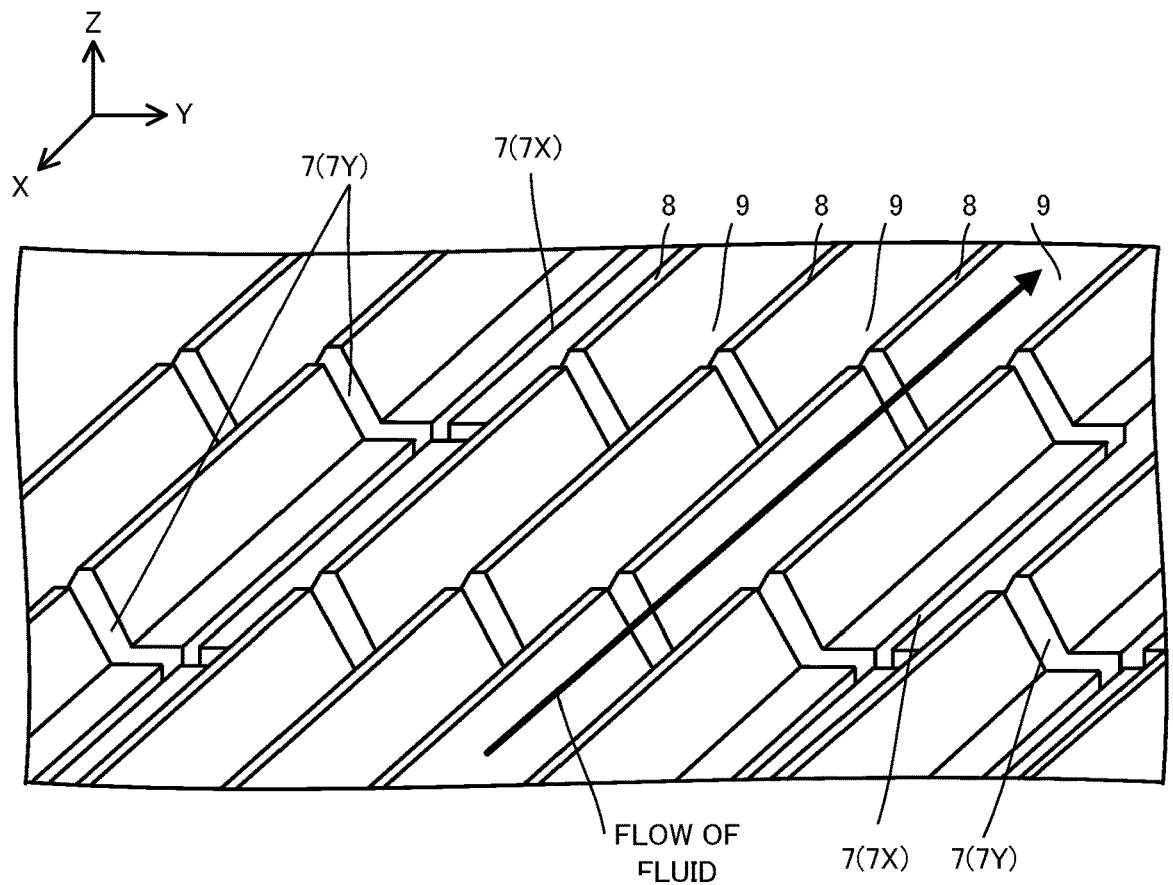
FIG. 21 is a perspective view that illustrates the turbine blade on which both of the grooves and the riblet structure are formed.
Figure 22:
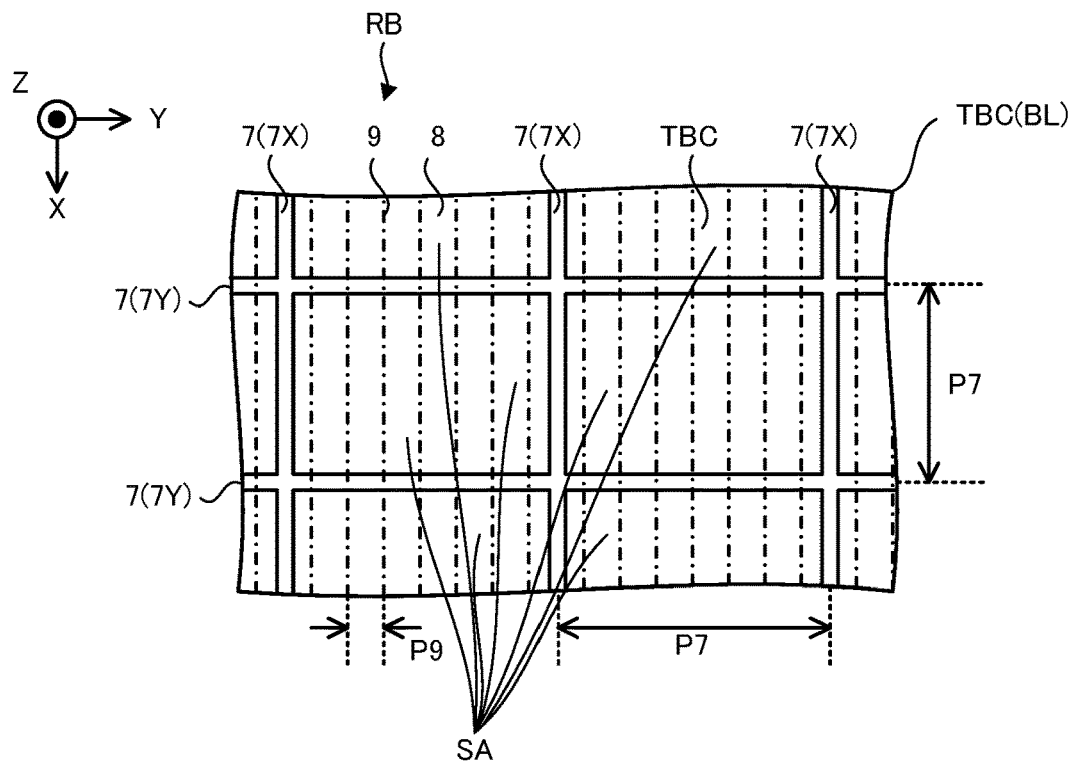
FIG. 22 is a top view that illustrates the turbine blade on which both of the grooves and the riblet structure are formed.

The processing system SYS may form the riblet structure RB that satisfies a structure condition described below when the riblet structure RB is formed on the turbine blade BL on which the groove 7 has been formed (alternatively, the riblet structure RB is formed on the turbine blade BL before forming the groove 7). Next, with reference to FIG. 20 to FIG. 22, the structure condition that should be satisfied by the riblet structure RB will be described. FIG. 20 is a cross-sectional view that illustrates the turbine blade BL on which both of the grooves 7 and the riblet structure RB have been formed. FIG. 21 is a perspective view that illustrates the turbine blade BL on which both of the grooves 7 and the riblet structure RB have been formed. FIG. 22 is a top view that illustrates the turbine blade BL on which both of the grooves 7 and the riblet structure RB have been formed. Incidentally, in an example illustrated in FIG. 20 to FIG. 22, the processing system SYS forms the riblet structure RB whose top part 83 includes the planar surface 831, whose boundary part 84 includes the planar surface 841 and which satisfies the structure condition (namely, the riblet structure RB that includes the top part 83 illustrated in FIG. 12 and the boundary part 84 illustrated in FIG. 15 and that satisfies the structure condition). However, the processing system SYS may form the riblet structure RB that includes the top part 83 having a shape different from the shape illustrated in FIG. 12 and/or the boundary part 84 having a shape different from the shape illustrated in FIG. 15 and that satisfies the structure condition.

The structure condition may include a depth condition related to a depth D9 of the groove 9 for constituting the riblet structure RB. For example, the depth condition may include a first depth condition related to the depth D9 of the groove 9 itself. The first depth condition may include a condition that the depth D9 of the groove 9 is from 1 micro-meter to 99 micro-meter (namely, several micro-meter to several dozens micro-meter). For example, the depth condition may include a second depth condition related to a relationship between the depth D9 of the groove 9 and the thickness D of the heat resistant layer TBC, in addition to or instead of the first depth condition. The second depth condition may include a condition that the depth D9 of the groove 9 is smaller than the thickness D of the heat resistant layer TBC as illustrated in FIG. 20 and FIG. 21. The second depth condition may include a condition that the depth D9 of the groove 9 is between 0.2% and 20% inclusive of the thickness D of the heat resistant layer TBC. For example, the depth condition may include a third depth condition related to a relationship between the depth D9 of the groove 9 and the depth D7 of the groove 7, in addition to or instead of at least one of the first and second depth conditions. The third depth condition may include a condition that the depth D9 of the groove 9 is different from the depth D7 of the groove 7 as illustrated in FIG. 20 and FIG. 21. The third depth condition may include a condition that the depth D9 of the groove 9 is smaller than the depth D7 of the groove 7 (namely, the groove 9 is shallower than the groove 7) as illustrated in FIG. 20 and FIG. 21. In other words, the third depth condition may include a condition that the depth D7 of the groove 7 is larger than the depth D9 of the groove 9 (namely, the groove 7 is deeper than the groove 9) as illustrated in FIG. 20 and FIG. 21. The third depth condition may include a condition that the depth D7 of the groove 7 is between 1.5 times and 15 times inclusive of the depth D9 of the groove 9.

Figure 23:
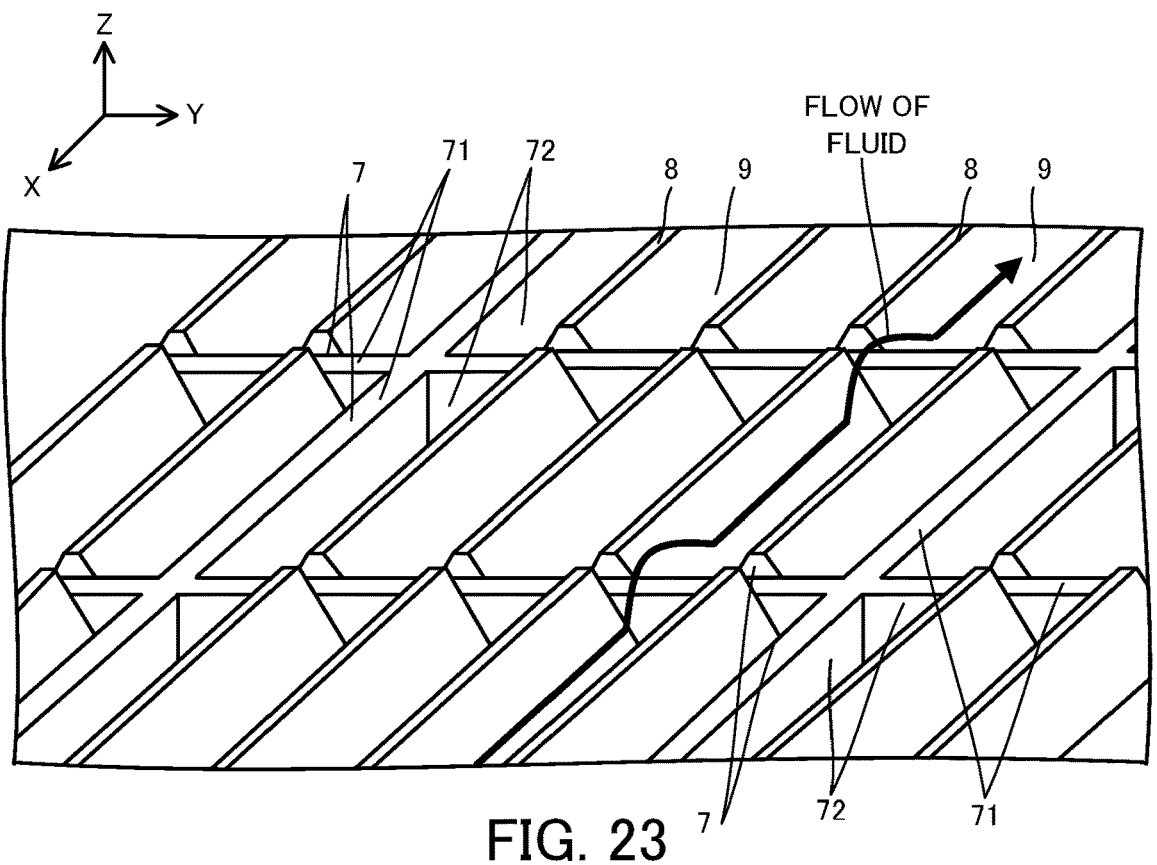
FIG. 23 is a perspective view that illustrates the turbine blade on which both of the riblet structure and the grooves the depth of which is smaller than a depth of the riblet structure are formed.

Here, when the third depth condition (especially, the condition that the depth D9 of the groove 9 is smaller than the depth D7 of the groove 7) of the depth condition is satisfied, there is a low possibility that the groove 9 prevents the effect of the riblet structure RB (namely, the effect of reducing the resistance of the surface of the turbine blade BL to the fluid). Specifically, as illustrated in FIG. 23, when the depth D9 of the groove 9 is larger than the depth D7 of the groove 7, a bottom part 71 of the groove 7 is located above a bottom part of the groove 9 (namely, the boundary part 84). As a result, a wall 72 an upper surface of which is the bottom part 71 of the groove 7 exists between the plurality of convex structures 8. There is a possibility that the wall 72 blocks the fluid flowing between the plurality of convex structures 8 (namely, in the grooves 9) along the plurality of convex structures 8 as illustrated in FIG. 23. Namely, as illustrated in FIG. 23, there is a possibility that the wall 72 disrupts a flow of the fluid along the convex structure 8. Especially, when the direction along which the convex structure 8 extends intersects with the direction along which the groove 7 extends, there is a high possibility that the wall 72 disrupts the flow of the fluid along the convex structure 8. However, when the depth D9 of the groove 9 is smaller than the depth D7 of the groove 7, the wall 72 the upper surface of which is the bottom part 71 of the groove 7 does not exist between the plurality of convex structures 8 as illustrated in FIG. 21. As a result, there is a low possibility that the wall 72 disrupts the flow of the fluid flowing between the plurality of convex structures 8 (namely, in the grooves 9) along the plurality of convex structures 8 as illustrated in FIG. 21. Thus, it is possible to achieve the effect of reducing the resistance of the surface of the turbine blade BL to the fluid by the riblet structure RB. Incidentally, when the direction along which the convex structure 8 extends is parallel to the direction along which the groove 7 extends, there is a possibility that the effect of the riblet structure RB is reduced because the groove 7 forms a part having different height (for example, a structure having a height different from that of the convex structure 8) is formed in the riblet structure RB including the plurality of convex structures 8.

The structure condition may include a pitch condition related to the pitch P9 of the groove 9 for constituting the riblet structure RB. The pitch condition may include a condition related to a relationship between the pitch P9 of the groove 9 and the pitch P7 of the groove 7. Especially, the pitch condition may include a condition related to a relationship between the pitch P9 of the groove 9 in one direction and the pitch P7 of the groove 7 in the same one direction. In the example illustrated in FIG. 20 and FIG. 22, the pitch condition may include a condition related to a relationship between the pitch P9 of the groove 9 in the Y axis direction and the pitch P7 of the groove 7 in the Y axis direction. However, the pitch condition may include a condition related to a relationship between the pitch P9 of the groove 9 in one direction and the pitch P7 of the groove 7 in another direction that is different from the one direction. In the example illustrated in FIG. 20 and FIG. 22, the pitch condition may include a condition related to a relationship between the pitch P9 of the groove 9 in the Y axis direction and the pitch P7 of the groove 7 in the X axis direction. For example, the pitch condition may include a condition that the pitch P9 of the groove 9 is different from the pitch P7 of the groove 7. For example, the pitch condition may include a condition that the pitch P7 of the groove 7 is larger than the pitch P9 of the groove 9. For example, the pitch condition may include a condition that the pitch P7 of the groove 7 is equal to or larger than twice of the pitch P9 of the groove 9. When the condition that the pitch P7 of the groove 7 is equal to or larger than twice of the pitch P9 of the groove 9 is satisfied, two or more grooves 9 are formed between two grooves 7 that are adjacent to each other along the direction intersecting with the extending direction of the groove 7 (namely, a short direction of the groove 7) as illustrated in FIG. 20 and FIG. 22. In this case, the pitch condition may include a condition that the pitch P7 of the groove 7 and the pitch P9 of the groove 9 are set so that two or more grooves 9 are formed between two grooves 7 that are adjacent to each other along the direction intersecting with the extending direction of the groove 7. For example, the pitch condition may include a condition that the pitch P7 of the groove 7 is between 20 times and 30 times inclusive of the pitch P9 of the groove 9. In other words, the pitch condition may include a condition that the pitch P7 of the groove 7 and the pitch P9 of the groove 9 are set so that twenty to thirty grooves 9 are formed between two grooves 7 that are adjacent to each other along the direction intersecting with the extending direction of the groove 7. For example, the pitch condition may include a condition that the pitch P7 of the groove 7 is an integral multiple of the pitch P9 of the groove 9. When the condition that the pitch P7 of the groove 7 is an integral multiple of the pitch P9 of the groove 9 is satisfied, the integral number of grooves 9 are formed between two grooves 7 that are adjacent to each other along the direction intersecting with the extending direction of the groove 7. In this case, the processing system SYS is capable of relatively easily forming the riblet structure RB having a regular structure on the turbine blade BL on which the groove 7 is formed.

The structure condition may include a width condition related to a width W9 of the groove 9 for constituting the riblet structure RB. The width condition may include a condition related to a relationship between the width W9 of the groove 9 and a width W7 of the groove 7. Note that "the width W9 of the groove 9" in the present example embodiment may mean a size of the groove 9 in a direction intersecting with the extending direction of the groove 9 (namely, a short direction of the groove 9). Similarly, "the width W7 of the groove 7" in the present example embodiment may mean a size of the groove 7 in a direction intersecting with the extending direction of the groove 7 (namely, the short direction of the groove 7). For example, the width condition may include a condition that the width W9 of the groove 9 is different from the width W7 of the groove 7. For example, the width condition may include a condition that the width W7 of the groove 7 is larger than the width W9 of the groove 9. For example, the width condition may include a condition that the width W7 of the groove 7 is between 1 times and 10 times inclusive of the width W9 of the groove 9.

The structure condition may include an extending direction condition related to the extending direction of the groove 9 for constituting the riblet structure RB. The extending direction condition may include a condition related to a relationship between the extending direction of at least one groove 9 and the extending direction of at least one groove 7. Note that "the extending direction of the groove 9" in the present example embodiment may mean a direction in which the groove 9 extends along the surface of the turbine blade BL (for example, the surface of the heat resistant layer TBC) on which the groove 9 is formed. Similarly, "the extending direction of the groove 7" in the present example embodiment may mean a direction in which the groove 7 extends along the surface of the turbine blade BL (for example, the surface of the heat resistant layer TBC) on which the groove 7 is formed. For example, the extending direction condition may include a condition that the extending direction of at least one groove 9 is same as the extending direction of at least one groove 7. Namely, the extending direction condition may include a condition that the extending direction of at least one groove 9 is parallel to the extending direction of at least one groove 7. For example, the extending direction condition may include a condition that the extending direction of at least one groove 9 is different from the extending direction of at least one groove 7. Namely, the extending direction condition may include a condition that the extending direction of at least one groove 9 intersects with the extending direction of at least one groove 7. Especially, the extending direction condition may include a condition that the extending direction of at least one groove 9 is perpendicular to the extending direction of at least one groove 7. In the example illustrated in FIG. 21 and FIG. 22, the extending direction condition includes a condition that the extending direction of each of the plurality of grooves 9 is same as the extending direction of the groove 7X (namely, the X axis direction) in a situation where at least one groove 7X extends along the X axis direction and at least one groove 7Y extends along the Y axis direction. However, the extending direction condition may include a condition that at least one of the plurality of grooves 9 extends along at least one of the X axis direction and the Y axis direction in a situation where at least one groove 7 extends along the X axis direction and at least one groove 7 extends along the Y axis direction.

Moreover, the structure condition may include a pitch direction condition related to the pitch direction of the groove 9 for constituting the riblet structure RB. The pitch direction condition may include a condition related to a relationship between the pitch direction of the plurality of grooves 9 and the pitch direction of the plurality of grooves 7. Note that "the pitch direction of the groove 9" in the present example embodiment may mean a pitch direction along the surface of the turbine blade BL (for example, the surface of the heat resistant layer TBC) on which the plurality of grooves 9 are formed. Similarly, "the pitch direction of the groove 7" in the present example embodiment may mean a pitch direction along the surface of the turbine blade BL (for example, the surface of the heat resistant layer TBC) on which the plurality of grooves 7 are formed. For example, the pitch direction condition may include a condition that the pitch direction of the plurality of grooves 9 is same as the pitch direction of the plurality of grooves 7. Namely, the pitch direction condition may include a condition that the pitch direction of the plurality of grooves 9 is parallel to the pitch direction of the plurality of grooves 7. For example, the pitch direction condition may include a condition that the pitch direction of the plurality of grooves 9 is different from the pitch direction of the plurality of grooves 7. Namely, the pitch direction condition may include a condition that the pitch direction of the plurality of grooves 9 intersects with the pitch direction of the plurality of grooves 7. Especially, the pitch direction condition may include a condition that the pitch direction of the plurality of grooves 9 is perpendicular to the pitch direction of the plurality of grooves 7. Namely, the pitch direction condition may include a condition that the pitch direction of the plurality of grooves 9 is parallel to the pitch direction of the plurality of grooves 7 . . . . In the example illustrated in FIG. 21 and FIG. 22, the pitch direction condition includes a condition that the pitch direction of each of the plurality of grooves 9 is same as the pitch direction of the groove 7X (namely, the Y axis direction) in a situation where the pitch direction of the plurality of grooves 7X is the Y axis direction and the pitch direction of the plurality of grooves 7Y is the X axis direction. However, the pitch direction condition may include a condition that the pitch direction of the plurality of grooves 9 is same as at least one of the X axis direction and the Y axis direction in a situation where the pitch direction of the plurality of grooves 7 is the Y axis direction and the pitch direction of the plurality of grooves 7 is the X axis direction.

The above described structure conditions are examples of a condition that is set from a viewpoint of manufacturing the turbine blade BL which has a relatively high durability relative to the stress and whose resistance to the fluid is properly reduced. Thus, when the structure condition is satisfied, the durability of the turbine blade BL to the stress is higher and/or the resistance of the turbine blade BL to the fluid is smaller, compared to a case where the structure condition is not satisfied.

When the plurality of grooves 7 are formed, the surface of the turbine blade BL (for example, the surface of the heat resistant layer TBC) may be divided into a plurality of surface areas SA by the plurality of grooves 7 as illustrated in FIG. 22. In this case, the structure condition related to the groove 9 formed in a first surface area SA of the plurality of surface areas SA may be same as the structure condition related to the groove 9 formed in a second surface area SA of the plurality of surface areas SA that is different from the first surface area SA. The structure condition is a condition related to at least one of the depth W9, the pitch P9, the width W9, the pitch direction and extending direction of the groove 9. At least one of the depth W9, the pitch P9, the width W9, the pitch direction and extending direction of the groove 9 is one example of a characteristic of the groove 9. Thus, the characteristic of the groove 9 formed in the first surface area SA of the plurality of surface areas SA may be same as the characteristic of the groove 9 formed in the second surface area SA of the plurality of surface areas SA. Note that FIG. 22 illustrates an example in which the structure conditions in all of the plurality of surface areas SA are same as each other.

Figure 24:
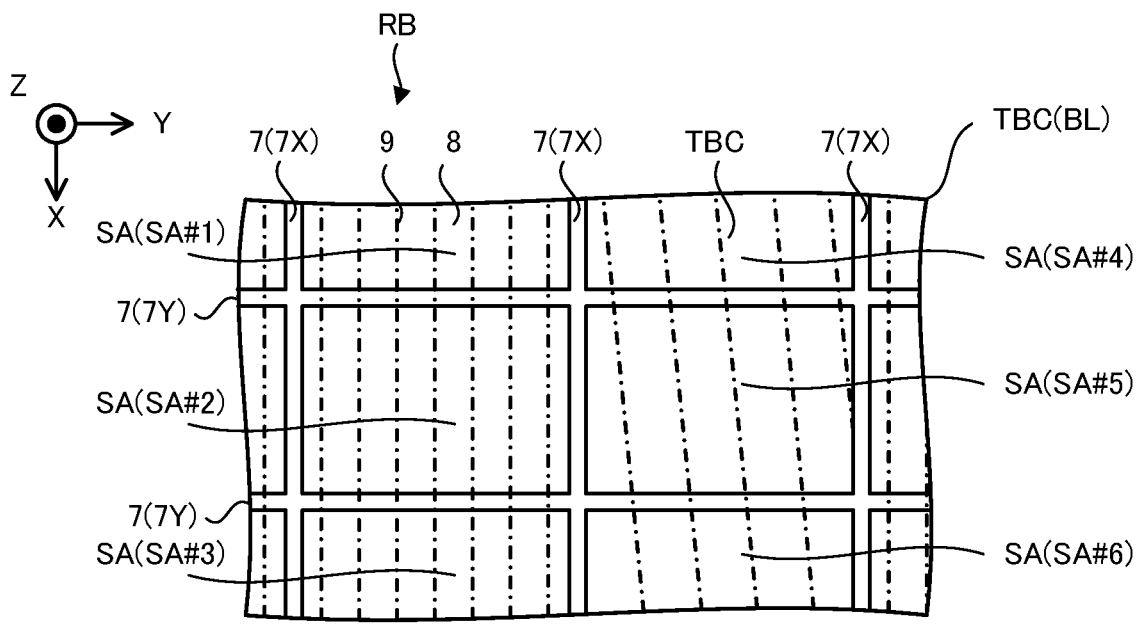
FIG. 24 is a top view that illustrates the turbine blade on which both of the grooves and the riblet structure are formed.

Alternatively, the structure condition related to the groove 9 formed in the first surface area SA of the plurality of surface areas SA may be different from the structure condition related to the groove 9 formed in the second surface area SA of the plurality of surface areas SA. Namely, the characteristic of the groove 9 formed in the first surface area SA of the plurality of surface areas SA may be different from the characteristic of the groove 9 formed in the second surface area SA of the plurality of surface areas SA. For example, as illustrated in FIG. 24 that is a top view illustrating the turbine blade BL on which both of the grooves 7 and the riblet structure RB are formed, the pitch P9 of the grooves 9 formed in the surface areas SA #1 to SA #3 may be different from the pitch P9 of the grooves 9 formed in the surface areas SA #4 to SA #6. As illustrated in FIG. 24, the extending direction of the grooves 9 formed in the surface areas SA #1 to SA #3 may be different from the extending direction of the grooves 9 formed in the surface areas SA #4 to SA #6. Moreover, as illustrated in FIG. 24, the pitch direction of the plurality of grooves 9 formed in the surface areas SA #1 to SA #3 may be different from the pitch direction of the plurality of grooves 9 formed in the surface areas SA #4 to SA #6.

Figure 25:
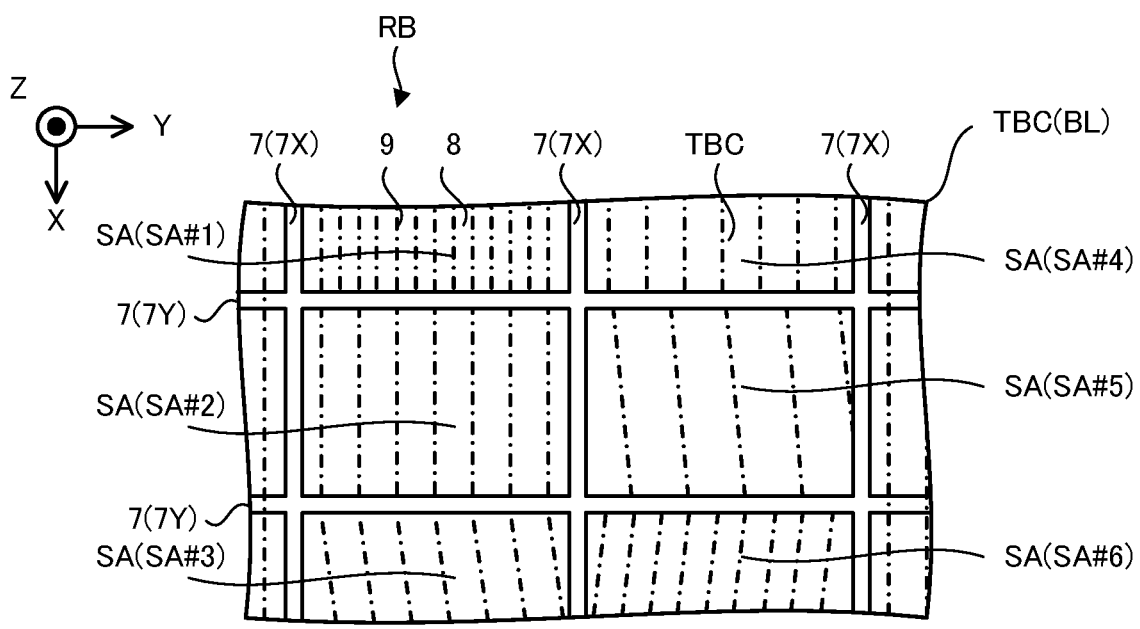
FIG. 25 is a top view that illustrates the turbine blade on which both of the grooves and the riblet structure are formed.

Moreover, as illustrated in FIG. 25 that is a top view illustrating the turbine blade BL on which both of the grooves 7 and the riblet structure RB are formed, the pitch P9 of the grooves 9 formed in the surface area SA #1 may be different from the pitch P9 of the grooves 9 formed in the surface area SA #2 that is adjacent to the surface area SA #1 along the extending direction of the groove 9. The extending direction (or the pitch direction) of the grooves 9 formed in the surface area SA #2 may be different from the extending direction (or the pitch direction) of the grooves 9 formed in the surface area SA #3 that is adjacent to the surface area SA #2 along the extending direction of the groove 9. The extending direction (or the pitch direction) of the grooves 9 formed in the surface area SA #2 may be different from the extending direction (or the pitch direction) of the grooves 9 formed in the surface area SA #5 that is adjacent along the direction (the pitch direction) intersecting with the extending direction of the groove 9 formed in the surface area SA #2. Moreover, the extending direction (or the pitch direction) and the pitch P9 of the grooves 9 formed in the surface area SA #5 may be respectively different from the extending direction (or the pitch direction) and the pitch P9 of the grooves 9 formed in the surface area SA #6 that is adjacent to the surface area SA #5 along the extending direction of the groove 9.

The structure condition (in other words, the characteristic of the groove 9) used for each surface area SA may be set based on a characteristic of the fluid contacting with each surface area SA. For example, the structure condition (in other words, the characteristic of the groove 9) used for each surface area SA may be set to be a condition (a characteristic) that allows the resistance of each surface area SA to the fluid contacting with each surface area SA to be reduced. As a result, it is possible to manufacture the turbine blade BL whose resistance to the fluid is properly reduced more properly, compared to a case where the structure conditions (in other words, the characteristics of the grooves 9) used for the plurality of surface areas SA are same as each other.

Note that the above described FIG. 19 to FIG. 24 illustrates an example in which the groove 7 is formed on the heat resistant layer TBC. However, the groove 7 may be formed on the base member BM. In this case, the processing system SYS may form the riblet structure RB on the base member BM on which the groove 7 has been formed. Alternatively, the processing system SYS may form the groove 7 on the base member BM after forming the riblet structure RB. Even in this case, the processing system SYS may form the riblet structure RB to satisfy the above described structure condition.

Figure 26:
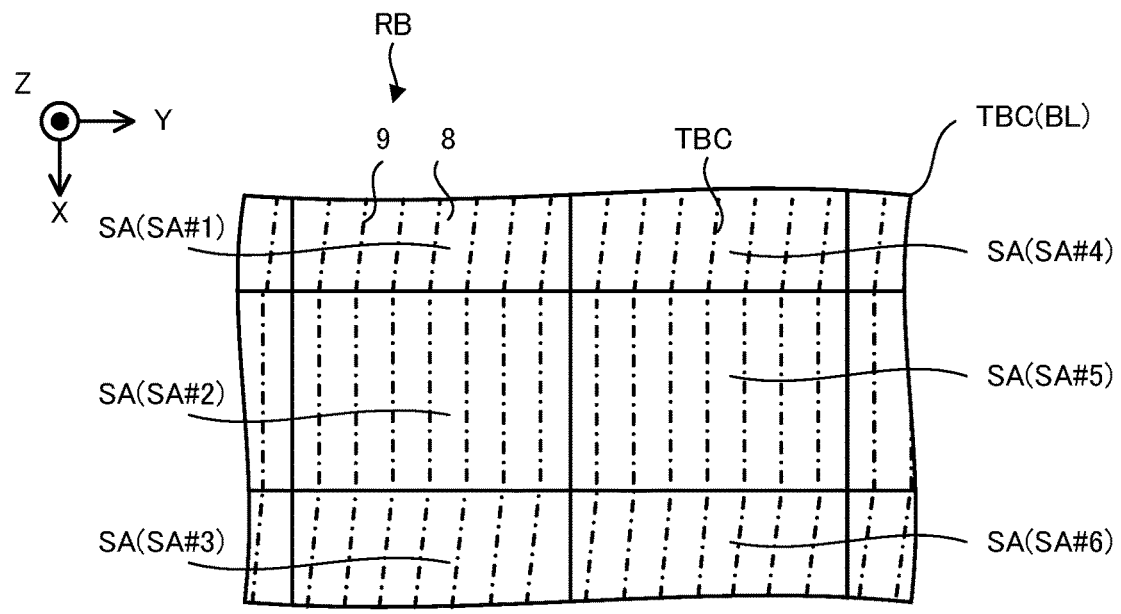
FIG. 26 is a top view that illustrates the turbine blade on which the riblet structure is formed.

Moreover, the groove 7 may not be formed on the heat resistant layer TBC as illustrated in FIG. 26. Note that FIG. 26 illustrates lines that represent a border of each of the surface areas SA #1 to SA #6, however, these lines are virtual.

(5) Modified Example

The processing system SYS may include a processing head that irradiates the workpiece W with the processing light EL and that does not irradiate the workpiece W with the measurement light ML and a measurement head that irradiates the workpiece W with the measurement light ML and that does not irradiate the workpiece W with the processing light EL.

In the above described description, the processing system SYS includes the emission optical system 113 that emits both of the processing light EL and the measurement light ML toward the workpiece W. However, the processing system SYS may include the emission optical system 113 that emits the processing light EL toward the workpiece W and the emission optical system 113 that emits the measurement light ML toward the workpiece W separately. In this case, each emission optical system 113 may not include the beam splitter 1131 that combines the processing light EL and the measurement light ML.

In the above described description, the processing apparatus 1 is configured to measure the workpiece W. However, the processing apparatus 1 may not be configured to measure the workpiece W. In this case, the processing apparatus 1 may not include the measurement optical system 112. The processing system SYS may not include the measurement light source 22.

In the above described description, the processing apparatus 1 includes the head driving system 12. However, the processing apparatus 1 may not include the head driving system 12. Namely, the processing head 11 may not be movable. In this case, the processing apparatus 1 may not include the position measurement apparatus 13.

In the above described description, the stage apparatus 3 includes the stage driving system 33. However, the stage apparatus 3 may not include the stage driving system 33. Namely, the stage 32 may not be movable. In this case, the stage apparatus 3 may not include the position measurement apparatus 34.

In the above described description, the processing system SYS processes the turbine blade BL including the base member BM and the heat resistant layer TBC. However, the processing system SYS may process the turbine blade BL including the base member BM and any coat layer that is formed on the base member BM and that is different from the heat resistant layer TBC. In this case, the processing system SYS may form the riblet structure RB on any coat layer. For example, the processing system SYS may form the riblet structure RB including at least one of the top part 83 and the boundary part 84, which are described with reference to FIG. 12 to FIG. 18, on any coat layer. For example, the processing system SYS may form the riblet structure RB on any coat layer on which the groove 9, which is different from the groove 7 for constituting the riblet structure RB, is formed. For example, the processing system SYS may form the riblet structure RB and the groove 9, which is different from the groove 7 for constituting the riblet structure RB, on any coat layer. For example, any coat layer may be formed on the base member BM on which the processing system SYS forms the riblet structure RB. Note that a protection layer for protecting the base member BM is one example of any coat layer.

Any coat layer formed on the base member BM may include a layer that is newly formed by adding a material to the base member BM. Alternatively, any coat layer formed on the base member BM may include a layer that correspond to a part of the base member BM a characteristic of which is changed. Namely, any coat layer may include a layer that correspond to a part of the base member BM a characteristic of which is changed and that is newly formed to be adjacent to a part of the base member BM a characteristic of which is not changed by changing the characteristic of a part of the base member BM. In other words, a part of the base member BM the characteristic of which is changed may be used as the coat layer and a part of the base member BM the characteristic of which is not changed may be used as the base member BM. A part the characteristic of which is changed by the quenching is one example of the layer corresponding to the part of the base member BM the characteristic of which is changed. In this case, the coat layer may be formed by the surface treatment on the surface of the base member BM. The quenching is one example of the surface treatment. The quenching may include at least one of a high frequency quenching, a fire quenching, a laser quenching and an electron beam quenching. The coat film formed by the quenching is harder than a part of the base member BM the characteristic of which is not changed by the quenching. It can be said that the quenching is one specific example of a surface hardening for hardening the surface of the base member. In this case, the coat layer may serve as the protection layer for protecting the base member BM.

Figure 27:
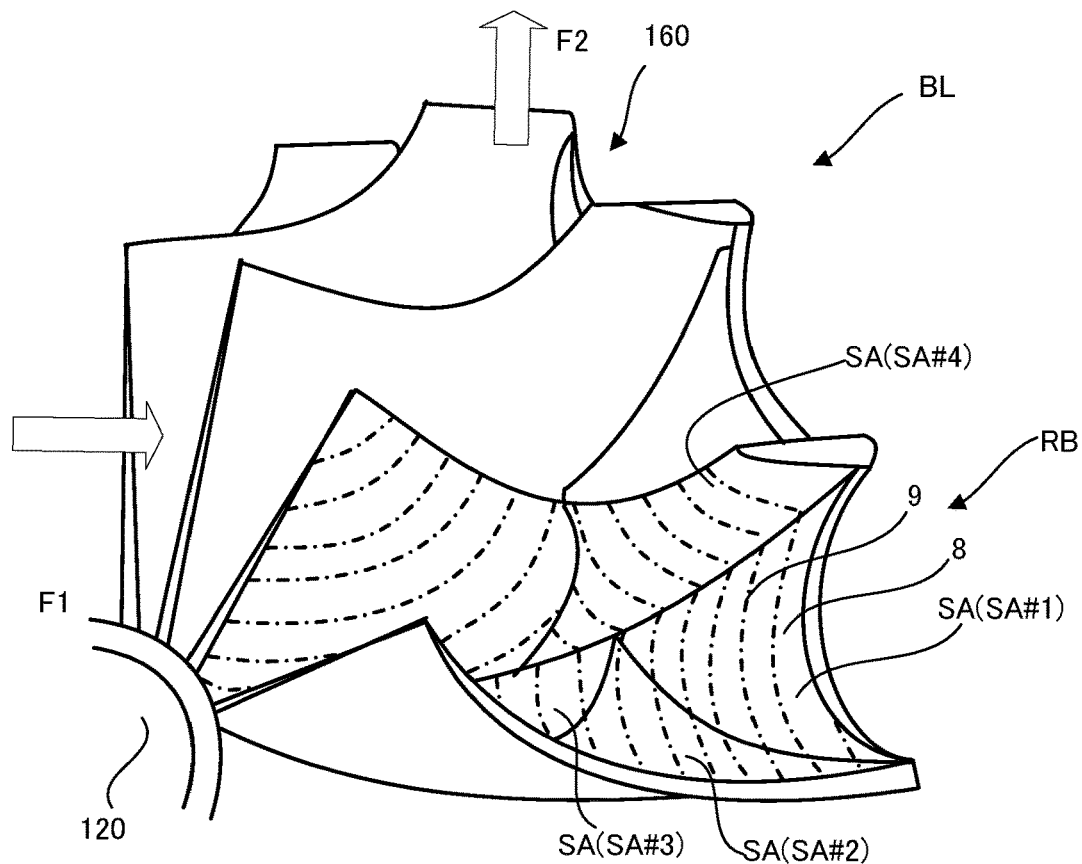
FIG. 27 is a perspective view that illustrates a radial type of turbine blade on which the riblet structure is formed.

In the above described description, the processing system SYS processes the axial-flow turbine blade BL. However, as illustrated in FIG. 27, the processing system SYS processes a radial-flow turbine blade BL. In FIG. 27, as illustrated by arrows F1 an F2, the fluid flows in the turbine blade BL in parallel with a rotational axis 120 of the turbine blade BL and flows out from an exit part 160 in parallel with the rotational axis line 120.

Even in this case, the riblet structure RB may be divided into the plurality of surface areas SA. The structure condition related to the groove 9 formed in a first surface area SA #1 of the plurality of surface areas SA may be same as the structure condition related to the groove 9 formed in a second surface area SA #2 of the plurality of surface areas SA that is different from the first surface area SA #1. The structure condition is the condition related to at least one of the depth W9, the pitch P9, the width W9, the pitch direction and extending direction of the groove 9, as described above. At least one of the depth W9, the pitch P9, the width W9, the pitch direction and extending direction of the groove 9 is one example of the characteristic of the groove 9. Thus, the characteristic of the groove 9 formed in the first surface area SA of the plurality of surface areas SA may be same as the characteristic of the groove 9 formed in the second surface area SA of the plurality of surface areas SA. Moreover, the structure condition related to the groove 9 formed in the first surface area SA #2 of the plurality of surface areas SA may be different from the structure condition related to the groove 9 formed in a third surface area SA #3 of the plurality of surface areas SA. Here, divided shapes of the plurality of surface areas SA #1 to SA #4 may not be rectangular shapes as illustrated in FIG. 27.

In the above described description, the processing system SYS processes the turbine blade BL that is one example of the workpiece W. However, the processing system SYS may process any blade that is different from the turbine blade BL and that is another example of the workpiece W. Any blade may include a base member and any coat layer formed on the base member, as with the above described turbine blade BL. In this case, for example, the processing system SYS may form the riblet structure RB on any blade that is different from the turbine blade BL. Namely, the processing system SYS may form the riblet structure RB on at least one of the base member and the coat layer of any blade. A blade that constitutes a wing of a propeller is one example of any blade. The propeller is a member that converts a rotational power outputted from a power source including at least one of an engine and a motor into a moving power of a movable body including at least one of an airplane and a ship, for example.

Alternatively, the processing system SYS may process any object that is different from the blade and that is another example of the workpiece W. Any object may include a base member and any coat layer formed on the base member, as with the above described turbine blade BL. In this case, for example, the processing system SYS may form the riblet structure RB on any object. Namely, the processing system SYS may form the riblet structure RB on at least one of the base member and the coat layer of any object.

In the above described description, the processing system SYS forms the riblet structure RB that has a function of reducing the resistance of the surface of the turbine blade BL to the fluid. However, the processing system SYS may form a structure that has a function different from the function of reducing the resistance of the surface of the turbine blade BL to the fluid. For example, the processing system SYS forms, on the workpiece W, a riblet structure that has a function of reducing a noise generated when the fluid and the surface of the workpiece W relatively move. For example, the processing system SYS forms, on the workpiece W, a riblet structure that has a function of generating a swirl relative to the flow of the fluid on the surface of the workpiece W. For example, the processing system SYS forms, on the workpiece W, a structure that provides a hydrophobic properly to the surface of the workpiece W.

In the above described description, the processing system SYS forms the riblet structure RB on the surface of the workpiece W. However, the processing system SYS May form any structure having any shape on the surface of the workpiece W. A fine texture structure (typically, a concave and convex structure) that is formed regularly or irregularly in a micro/nano-meter order is one example of any structure. This fine texture structure may include at least one of a shark skin structure or a dimple structure that has a function of reducing a resistance from a fluid (a liquid and/or a gas). The fine texture structure may include a lotus leaf surface structure that has at least one of a liquid repellent function and a self-cleaning function (for example, has a lotus effect). The fine texture structure may include at least one of a fine protrusion structure that has a liquid transporting function (US2017/0044002A1), a concave and convex structure that has a lyophile effect, a concave and convex structure that has an antifouling effect, a moth eye structure that has at least one of a reflectance reduction function and a liquid repellent function, a concave and convex structure that intensifies only light of a specific wavelength by interference to have a structural color, a pillar array structure that has an adhesion function using van der Waals force, a concave and convex structure that has an aerodynamic noise reduction function, a honeycomb structure that has a droplet collection function, a concave and convex structure that improves an adherence to a layer formed on a surface and so on.

In the above described description, the processing system SYS processes the workpiece W by irradiating the workpiece W with the processing lights EL. However, the processing system SYS may process the workpiece W by irradiating the workpiece W with any energy beam that is different from the light. In this case, the processing system SYS may include a beam irradiation apparatus that is configured to emit any energy beam in addition to or instead of the processing light source 21. At least one of a charged particle beam, an electromagnetic wave and the like is one example of any energy beam. A least one of an electron beam, an ion beam and the like is one example of the charged particle beam.

Figure 28:
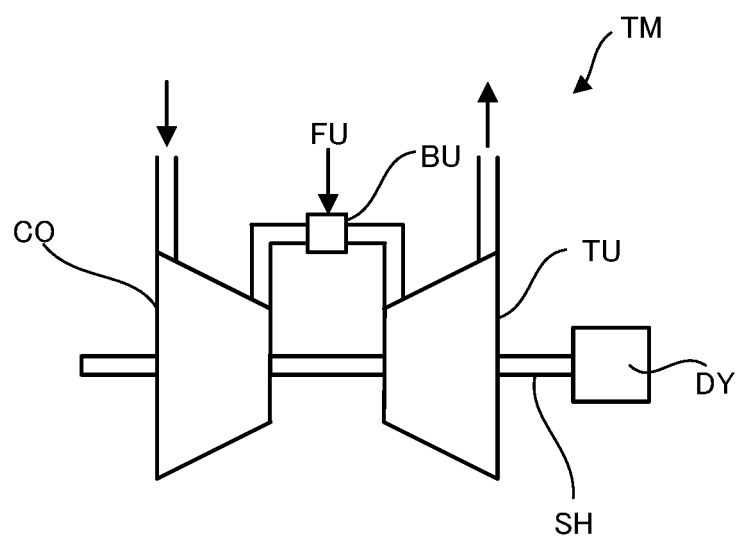
FIG. 28 is a diagram that illustrates a turbine machine in which the turbine blade is installed.

In the above described description, the turbine T may be referred to as a turbine machinery. The turbine machinery may include a plurality of turbines T. Moreover, as illustrated in FIG. 28, the turbine machinery TM may be connected to an electric power generator DY to drive the electric power generator DY. In FIG. 28, the turbine machinery TM may include: a compressor CO that compresses air; a combustor BU in which the air compressed by the compressor CO and fuel FU are mixed and burned; a turbine unit TU including the plurality of turbines T; and a shaft SH that connects the compressor CO and the turbine unit TU and that is rotatable. The turbine unit TU is rotated around the shaft SH by burned gas from the combustor BU. The rotational power is transmitted to the electric power generator DY through the shaft SH and also transmitted to the compressor CO. Moreover, the turbine machinery may include a jet engine.

The features of each example embodiment described above may be appropriately combined with each other. A part of the features of each example embodiment described above may not be used. Moreover, the disclosures of all publications and United States patents related to an apparatus and the like cited in each embodiment described above are incorporated in the disclosures of the present application by reference if it is legally permitted.

The present invention is not limited to the above described examples and is allowed to be changed, if desired, without departing from the essence or spirit of the invention which can be read from the claims and the entire specification, and a blade, a processing system and a processing method, which involve such changes, are also intended to be within the technical scope of the present invention.

DESCRIPTION OF REFERENCE CODES 1 processing apparatus
11 processing head
111 processing optical system
112 measurement optical system
113 emitting optical system
4 control apparatus
8 convex structure
81, 82 side surface
83 tip part
84 boundary part
7, 9 groove
EL processing light
ML measurement light
SYS processing system
W workpiece
BL turbine blade
BM base member
TBC heat resistant layer
RB riblet structure

The invention claimed is:

1. A blade for use in fluid, the blade comprising:
a base member; and
a coat layer that is formed on the base member, wherein
a plurality of first grooves, each of which has a first depth, and a plurality of second grooves, each of which has a second depth that is larger than the first depth, are formed on a surface of the coat layer,
a pitch of the plurality of first grooves is smaller than a pitch of the plurality of second grooves,
the plurality of first grooves include a groove configured to reduce a resistance of the coat layer to fluid, and
a direction along which at least one of the plurality of second grooves extends along the surface of the coat layer is different from a direction along which at least one of the plurality of first grooves extends along the surface of the coat layer.

2. The blade according to claim 1, wherein
the plurality of first grooves are formed between two second grooves of the plurality of second grooves.

3. The blade according to claim 1, wherein
a depth of a first groove of the plurality of first grooves is between 0.2% and 20% inclusive of a thickness of the coat layer.

4. The blade according to claim 1, wherein
a depth of a second groove of the plurality of second grooves is equal to or smaller than 30% of a thickness of the coat layer.

5. The blade according to claim 1, wherein
a depth of a second groove of the plurality of second grooves is between 1.5 times and 15 times inclusive of a depth of a first groove of the plurality of first grooves.

6. The blade according to claim 1, wherein
a width of a first groove of the plurality of first grooves is different from a width of a second groove of the plurality of second grooves.

7. The blade according to claim 1, wherein
a width of a second groove of the plurality of second grooves is equal to or larger than a width of a first groove of the plurality of first grooves.

8. The blade according to claim 1, wherein
a width of a second groove of the plurality of second grooves is between 1 times and 10 times inclusive of a width of a first groove of the plurality of first grooves.

9. The blade according to claim 1, wherein
the pitch of the plurality of second grooves is equal to or larger than the pitch of the plurality of first grooves.

10. The blade according claim 1, wherein
the pitch of the plurality of second grooves is between 20 times and 30 times inclusive of the pitch of the plurality of first grooves.

11. The blade according to claim 1, wherein
the pitch of the plurality of second grooves is an integral multiple of the pitch of the plurality of first grooves.

12. The blade according to claim 1, wherein
a direction along which at least one of the plurality of second grooves extends along the surface of the coat layer is same as a direction along which at least one of the plurality of first grooves extends along the surface of the coat layer.

13. The blade according to claim 1, wherein
the plurality of first grooves include a groove for constituting a riblet structure.

14. The blade according to claim 13, wherein
the coat layer includes a heat resistant layer by which a transmission of heat from fluid to the base member is reducible.

15. The blade according to claim 1, wherein
the blade is a turbine blade.

16. The blade according to claim 1, wherein
an interval between the plurality of first grooves is different from an interval between the plurality of second grooves.

17. A turbine machinery comprising the blade according to claim 1.

18. The blade according to claim 1, wherein
a width of a second groove of the plurality of second grooves is narrower than the pitch of the plurality of second grooves.

19. A blade for use in fluid, the blade comprising:
a base member; and
a coat layer that is formed on the base member, wherein
a plurality of first grooves, each of which has a first depth, and a plurality of second grooves, each of which has a second depth that is larger than the first depth, are formed on a surface of the coat layer,
a pitch of the plurality of first grooves is smaller than a pitch of the plurality of second grooves,
the plurality of first grooves include a groove configured to reduce a resistance of the coat layer to fluid,
at least one of the plurality of second grooves extends along a first direction that is along the surface of the coat layer,
at least another one of the plurality of second grooves extends along a second direction that is along the surface of the coat layer and that intersects with the first direction, and
at least one of the plurality of first grooves extends along either one of the first direction and the second direction.

20. A blade for use in fluid, the blade comprising:
a base member; and
a coat layer that is formed on the base member, wherein
a plurality of first grooves, each of which has a first depth, and a plurality of second grooves, each of which has a second depth that is larger than the first depth, are formed on a surface of the coat layer,
a pitch of the plurality of first grooves is smaller than a pitch of the plurality of second grooves,
the plurality of first grooves include a groove configured to reduce a resistance of the coat layer to fluid,
the surface of the coat layer is divided into a plurality of areas by the plurality of second grooves, and a characteristic of a first groove of the plurality of first grooves formed in a first area of the plurality of areas is different from a characteristic of another first groove of the plurality of first grooves formed in a second area, which is different from the first area, of the plurality of areas, wherein the characteristic of the first groove and the characteristic of the other first groove each include at least one of a depth, a width, a pitch and an extending direction.

* * * * *